(12) United States Patent
Holloway

(10) Patent No.: US 11,884,994 B2
(45) Date of Patent: Jan. 30, 2024

(54) SYNTHETIC TITANIUM-CORUNDUM COMPOSITE MATERIAL, AND METHOD OF MAKING SAME

(71) Applicant: Scott Richard Holloway, Kelowna (CA)

(72) Inventor: Scott Richard Holloway, Kelowna (CA)

( * ) Notice: Subject to any disclaimer, the term of this patent is extended or adjusted under 35 U.S.C. 154(b) by 396 days.

(21) Appl. No.: 16/927,788

(22) Filed: Jul. 13, 2020

(65) Prior Publication Data
US 2021/0285074 A1  Sep. 16, 2021

Related U.S. Application Data

(60) Provisional application No. 62/873,292, filed on Jul. 12, 2019.

(51) Int. Cl.
| | |
|---|---|
| C22C 1/047 | (2023.01) |
| C22C 14/00 | (2006.01) |
| F41H 5/02 | (2006.01) |
| C04B 35/101 | (2006.01) |
| C22F 1/18 | (2006.01) |

(52) U.S. Cl.
CPC .......... C22C 1/047 (2023.01); C04B 35/1015 (2013.01); C22C 14/00 (2013.01); C22F 1/183 (2013.01); F41H 5/02 (2013.01); C04B 2235/3232 (2013.01)

(58) Field of Classification Search
CPC .................................................. C22C 1/0491
See application file for complete search history.

(56) References Cited

U.S. PATENT DOCUMENTS

| | | | |
|---|---|---|---|
| 2006/0032558 A1* | 2/2006 | Holloway | C22C 1/0491 423/598 |
| 2019/0093202 A1* | 3/2019 | Holloway | C22C 21/003 |
| 2019/0127827 A1* | 5/2019 | Holloway | C22C 29/12 |
| 2019/0151950 A1* | 5/2019 | Holloway | C22C 1/058 |

OTHER PUBLICATIONS

Madec et al., Alumina-titanium functionally graded composites produced by spark plasma sintering, Journal of Materials Processing Tech. 254 (2018) 277-282 (Year: 2018).*

Meir et al., Mechanical properties of Al2O3\Ti composites fabricated by spark plasma sintering, Ceramics International 41 (2015) 4637-4643 (Year: 2015).*

Li et al., Ti/ Al2O3 Functionally Gradient Material Prepared by the Explosive Compaction/SHS Process, J. Mater. Sci. Technol., vol. 15 No. 3, 1999, pp. 271-275 (Year: 1999).*

James Destefani, Introduction to Titanium and Titanium Alloys ASM Handbook, vol. 2: Properties and Selection: Nonferrous Alloys and Special-Purpose Materials ASM Handbook Committee, p. 586-591 (Year: 1990).*

* cited by examiner

*Primary Examiner* — Christopher S Kessler
(74) *Attorney, Agent, or Firm* — Burris Law, PLLC

(57) ABSTRACT

A synthetic titanium-corundum composite includes a titanium alloy and a coherently bonded corundum phase. The titanium alloy includes at least one elemental titanium solid solution and the atomic percentage of aluminum in the titanium alloy ranges from 0.5% to 24.5%.

13 Claims, 9 Drawing Sheets

SYNTHETIC TITANIUM-CORUNDUM COMPOSITE MATERIAL, AND METHOD OF MAKING SAME

CROSS-REFERENCE TO RELATED APPLICATIONS

This application claims priority to and the benefit of U.S. Provisional Application No. 62/873,292, filed on Jul. 12, 2019. The disclosure of the above application is incorporated herein by reference.

FIELD

The present disclosure relates to metal matrix composite materials and in particular, to a synthetic titanium-corundum composite material and method of making the same.

BACKGROUND

The statements in this section merely provide background information related to the present disclosure and may not constitute prior art.

Technical ceramics such as aluminum oxide ($Al_2O_3$), silicon carbide (SiC), and boron carbide ($B_4C$) exhibit very high hardness, low density, high strength, and high elastic modulus (Young's modulus). As a result, technical ceramics are used in many industrial applications, including as ballistic strike face tiles in composite armour systems. The high hardness of a strike face material causes a projectile to fragment upon impact, and the kinetic energy of the projectile fragments is dissipated by the subsequent fracture of the strike face tile. Therefore, both hardness and work of fracture are important properties with regard to the function of ballistic strike face materials. The work of fracture ($W_F$) may be calculated using the formula:

$$W_F = \frac{K_{Ic}^2}{E} \qquad \text{(Eq. 1)}$$

where $K_{Ic}$ is the fracture toughness and E is the Young's modulus of the material. Work of fracture has units of joules per square meter (J/m²) and is a measure of the energy required to create the new surface area resulting from fracture. In order to draw comparisons between different ballistic strike face materials in the context of lightweighting, it is useful to calculate the specific work of fracture ($\tilde{W}_F$) using the formula:

$$\tilde{W}_F = \frac{W_F}{d} \qquad \text{(Eq. 2)}$$

where d is the density of the material, and $\tilde{W}_F$ has units of J/g/(m²/cm³). In other words, the specific work of fracture is equivalent to the specific energy of fracture divided by the fracture surface density, which is to say:

$$\tilde{W}_F = \frac{\varepsilon_F}{d_{FS}} = \frac{E_P}{m \cdot d_{FS}} \qquad \text{(Eq. 3)}$$

where $\varepsilon_F$ is the specific energy of fracture (energy per unit mass), $d_{FS}$ is the fracture surface density (area per unit volume), $E_P$ is the kinetic energy of the projectile (assuming 100% dissipation), and m is the mass of the strike face. Therefore, when the kinetic energy of a projectile is held constant (e.g. when comparing different strike face materials against equivalent threats), any increase in specific work of fracture requires a decrease in mass, a decrease in fracture surface density, or both. From the perspective of lightweighting ballistic strike face materials, both a decrease in mass and a decrease in fracture surface density are beneficial.

As shown in Equation 1, work of fracture ($W_F$) is inversely proportional to Young's modulus (E). Therefore, the high Young's modulus values exhibited by $Al_2O_3$, SiC, and $B_4C$—which are 276-370 GPa, 400 GPa, and 430 GPa, respectively—are a detriment to the function of these ceramics as ballistic strike face materials. However, for monolithic crystalline materials such as technical ceramics, Young's modulus tends to increase with hardness, and high hardness is required in order to achieve projectile fragmentation.

As is well known in the art, metal-ceramic composites offer a potential solution for increasing the fracture toughness and work of fracture of ballistic strike face materials, while maintaining the minimum level of hardness required to fragment common projectiles. As disclosed in International PCT Application No. PCT/CA2017/050542 to Lumiant Corporation, a metal-ceramic composite suitable for ballistic strike face applications comprises a titanium aluminide alloy and aluminum oxide. The titanium aluminide alloy contains the phases TiAl and $Ti_3Al$, and the composite is produced according to the chemical reaction equation:

$$(7+x)Al+3(1+x)TiO_2 \rightarrow 3(1-2x)TiAl+3xTi_3Al+2(1+x)Al_2O_3-\Delta H \qquad \text{(Eq. 4)}$$

where $\Delta H$ is the change in enthalpy, also known as the heat of reaction, and wherein the value of x ranges from 0.04 to 0.20, resulting in an atomic percent of aluminum in the titanium aluminide alloy ranging from 40% to 48%. The chemical reaction equation for this composite is similar to a simpler and well known aluminothermic reaction:

$$7Al+3TiO_2 \rightarrow 3TiAl+2Al_2O_3-\Delta H \qquad \text{(Eq. 5)}$$

which is obtained by setting x=0 in Eq. 4, and which results in an atomic percent of aluminum of 50% in the titanium aluminide matrix. The change in enthalpy of a reaction at standard state may be determined according to Hess's Law:

$$\Delta H^\ominus = \Sigma \upsilon \cdot \Delta H_f^\ominus|_{products} - \Sigma \upsilon \cdot \Delta H_f^\ominus|_{reactants} \qquad \text{(Eq. 6)}$$

where $\upsilon$ is the number of moles, $\Delta H_f$ is enthalpy of formation, and the superscript $\ominus$ indicates standard state values for temperature and pressure of 25° C. and $10^5$ pascals (Pa), respectively. For the balanced stoichiometric reaction described by Eq. 5, the change in enthalpy is calculated as (note: the enthalpy of formation of pure elements is zero):

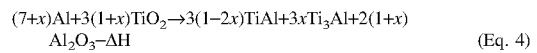

$$\Delta H^\ominus = 2 \cdot \Delta H_{f(Al_2O_3)}^\ominus + 3 \cdot \Delta H_{f(TiAl)}^\ominus - 3 \cdot \Delta H_{f(TiO_2)}^\ominus \qquad \text{(Eq. 7)}$$

which, based on available data, confirms the reaction is exothermic with the change in enthalpy value calculated as:

$$\Delta H^\ominus = \qquad \text{(Eq. 8)}$$
$$2 \text{ mol} \cdot \left(-1676 \frac{kJ}{mol}\right) + 3 \text{ mol} \cdot \left(-75.3 \frac{kJ}{mol}\right) - 3 \text{ mol} \cdot \left(-994.7 \frac{kJ}{mol}\right)$$

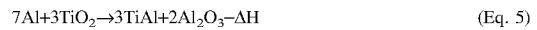

$$\Delta H^\ominus = -743.7 \text{ kJ} = -247.9 \frac{kJ}{\text{mol TiO}_2}$$

Similarly, Hess's Law can be extended to calculate the change in Gibbs free energy:

$$\Delta G^{\ominus} = \Sigma \upsilon \cdot \Delta G_f^{\ominus}|_{products} - \Sigma \upsilon \cdot \Delta G_f^{\ominus}|_{reactants} \quad \text{(Eq. 9)}$$

where $\Delta G_f$ is the Gibbs free energy of formation. For the balanced stoichiometric reaction described by Eq. 5 (note: the Gibbs free energy of formation of pure elements is zero):

$$\Delta G^{\ominus} = 2 \cdot \Delta G_{f(Al_2O_3)}^{\ominus} + 3 \cdot \Delta G_{f(TiAl)}^{\ominus} - 3 \cdot \Delta G_{f(TiO_2)}^{\ominus} \quad \text{(Eq. 10)}$$

and based on available data, the reaction is shown to be spontaneous with:

$$\Delta G^{\ominus} = \quad \text{(Eq. 11)}$$
$$2 \text{ mol} \cdot \left(-1582 \frac{kJ}{mol}\right) + 3 \text{ mol} \cdot \left(-73.3 \frac{kJ}{mol}\right) - 3 \text{ mol} \cdot \left(-889.4 \frac{kJ}{mol}\right)$$
$$\Delta G^{\ominus} = -715.7 \text{ kJ} = -238.6 \frac{kJ}{\text{mol TiO}_2}$$

Another implementation of Eq. 4 is obtained by setting x=0.07, which results in an atomic percent of aluminum of 46.5% in the titanium aluminide matrix, and which results in a metal-ceramic composite comprising a dual-phase matrix of TiAl and Ti$_3$Al, reinforced with Al$_2$O$_3$ at a volume fraction of 48.8%. For this reaction, $\Delta H^{\ominus}$ and $\Delta G^{\ominus}$ are −779.0 kJ (−242.7 kJ/mol-TiO$_2$) and −719.6 kJ (−224.2 kJ/mol-TiO$_2$), respectively, which confirms the reaction is both exothermic and spontaneous. According to published data, this composite exhibits Rockwell A hardness of 88 (Knoop hardness of 11.5 GPa), which is the same hardness as commercially available 96% pure Al$_2$O$_3$ (a common ballistic strike face material). The metal-ceramic composite has a measured fracture toughness of 7.4 MPa·m$^{1/2}$, Young's modulus of 261 GPa, and density of 3.95 g/cm$^3$. Based on this data, the specific work of fracture is 53 J/g/(m$^2$/cm$^3$) which, when compared to 21 J/g/(m$^2$/cm$^3$) for the equivalent-hardness Al$_2$O$_3$, suggests the composite is a superior ballistic strike face material. Notably, both the fracture toughness and the Young's modulus of the composite show excellent agreement with the rule-of-mixtures and can be estimated from the fracture toughness and Young's modulus of the composite's constituent materials. This agreement suggests complete interfacial bonding, also referred to as cohesion, between the matrix and reinforcement materials, which is a key advantage of in situ formed composites. For example, with fracture toughness and volume fraction for the titanium aluminide (TiAl and Ti$_3$Al) matrix equal to 9.7 MPa·m$^{1/2}$ and 51.2%, respectively, and for the Al$_2$O$_3$ equal to 5.0 MPa·m$^{1/2}$ and 48.8%, respectively, the rule-of-mixtures fracture toughness for the composite is 7.4 MPa·m$^{1/2}$. Likewise, the Young's modulus values of 174 GPa for the titanium aluminide (TiAl and Ti$_3$Al) matrix and 350 GPa for the high-purity Al$_2$O$_3$ reinforcement yield a rule-of-mixtures Young's modulus of 260 GPa for the composite.

There are various methods for synthesizing metal-ceramic composites such as those described by Eq. 4 and Eq. 5. However, it is well understood by those of ordinary skill in the art that the production of a high-density material requires blending the reactants in particulate form to obtain a mixture, and then more or less uniformly heating the mixture in a constrained volume subjected to an applied compressive load. As disclosed in International PCT Application No. PCT/CA2017/050540 to Lumiant Corporation, the rate of reaction of a given solid-state particulate mixture at constant uniform temperature will increase with an increase in applied compressive load. This dependence on applied compressive stress can be understood in the context of reaction kinetics, where the rate of reaction (v) for a second order chemical reaction of the form $$A + B \rightarrow P \quad \text{(Eq. 12)}$$

is generally given as $$v = k(T)[A][B] \quad \text{(Eq. 13)}$$

where [A] and [B] are the concentrations of the reactants, and k(T) is the temperature-dependent rate constant. The rate constant, which determines the rate for a fixed concentration of reactant, is of the form $$k(T) = Z(T) \cdot e^{-E_a/RT} \quad \text{(Eq. 14)}$$

where $E_a$ is the activation energy, R is the universal gas constant, and T is temperature. In reaction kinetics, the pre-exponential factor Z(T) is given various treatments, but it is generally accepted by those of ordinary skill in the art to represent the temperature-dependent frequency of atomic collisions between the reactants. Similarly, exponential term is generally accepted to be the probability that any given collision will result in a reaction.

For a system of reactants [A] and [B] at uniform temperature and isolated from the external environment by a heat transfer medium, any incremental increase in external temperature will transfer heat into the system and cause an incremental reaction and subsequent internal heat generation at a rate proportional to v. The incremental heat generated by the reaction is then transferred back out to the external environment. Since only an incremental portion of the reactants is consumed, such a reaction is said to be a controlled exothermic reaction. However, v itself increases with increased temperature, and therefore, with each incremental increase in external temperature, a greater proportion of reactants are consumed, and a greater proportion of heat is generated. When the change in temperature of the external environment immediately surrounding the system, as a result of the heat generated by the previous incremental reaction, equals the incremental increase in external temperature, the system reaches a critical condition which causes the exothermic reaction to proceed in an uncontrolled manner until all of the reactants have been consumed. The temperature at which the uncontrolled exothermic reaction starts is the critical temperature ($T_c$) which occurs when the following expression is satisfied:

$$T_C = T_0 + \frac{\Delta H[v(T_P) - v(T_0)]}{\overline{C}_P} \cdot \Delta t \bigg|_{T_P = 2T_C - T_0} \quad \text{(Eq. 15)}$$

where $T_0$ is the initial temperature of the system in equilibrium with its surroundings, $T_P$ is the peak temperature of the system, $\overline{C}_P$ is the heat capacity of the system, and $\Delta t$ is the reaction time.

The fundamental principles of reaction kinetics were developed in the study of gas-state reactions and have been applied successfully to liquid-state reactions. For solid-state particulate mixtures, the concentrations [A] and [B] are both effectively 1 or about 1, and the rate of reaction is further dependent upon the granule size and structural properties of the reactants, as well as the mechanical forces acting upon the solid-state particulate mixture. As a result, rate of reaction for a solid-state particulate mixture under an applied compressive stress is generally of the form $$v = M(\sigma, T) \cdot Z(T) \cdot e^{-E_a/RT} \quad \text{(Eq. 16)}$$

where $\sigma$ is the applied compressive stress, and M is the solid-state reaction model, which is further a function of the granule size and structure properties of the reactant particulates. Therefore, it can generally be said that the rate of reaction for the synthesis of a metal-ceramic composite from a solid-state particulate mixture, according to a chemical reaction formula that is both exothermic and spontaneous under standard state conditions, is dependent upon temperature, the granule size and structural properties of the reactants, and the applied compressive stress. For any given mixture held in a constrained volume at a constant uniform temperature, and with such a temperature being high enough for the mixture to store a total heat energy which exceeds the activation energy, the rate of reaction is purely a function of the applied compressive stress. That is to say, a particulate mixture can experience a temperature wherein the constituent granules store sufficient heat energy in the unreacted state as to permit, but not immediately cause, an uncontrolled exothermic reaction, whereby subsequent chemical mixing of the constituent particulates may then cause an uncontrolled exothermic reaction, with chemical mixing a function of the granule size and structural properties of the reactants, and whereby the chemical mixing is achieved with the application of the applied compressive stress.

In order to fully react the solid-state particulate mixture, the rate of heat generation, and therefore the rate of reaction, must exceed the combined effects of heat storage by the reactants and products, any melting or vaporization of the reactants or products, and the rate of heat loss to the surroundings, which may or may not be time-dependent. Likewise, the rate of reaction must be fast enough as to inhibit or prevent the formation of stable intermediate compounds, which can form at the interface between the reactants and thereby block any further reaction. In other words, the composition of reaction products is rate dependent, and a slow rate can result in an incomplete reaction.

Importantly, a sufficiently fast rate of reaction is one where the reaction is observed to have followed a theoretical two-step path of the form:

$$3TiO_2 + 7Al \rightarrow 3Ti + 7Al + 6O \qquad (1)$$

$$3Ti + 7Al + 6O \rightarrow 3TiAl + 2Al_2O_3 \qquad (2)(Eq.\ 17)$$

For the Ti—Al binary system and the chemical reaction equation in Eq. 5, the primary intermediate phase that can form is $TiAl_3$; however, a high rate of reaction will rapidly produce an atomic composition of 50% Ti and 50% Al, which will result in the direct formation of the TiAl phase. Similarly, the formula in Eq. 4 will result in a dual phase matrix of TiAl and $Ti_3Al$ phases only when the rate of reaction is sufficiently high as to rapidly achieve the proper atomic percent of Ti from the reduction of $TiO_2$, which is 53.5% for x=0.07 (equivalent to an atomic percent of Al of 46.5%).

While the specific work of fracture of the resulting metal-ceramic composite shows improvement as compared to the $Al_2O_3$ commonly used for ballistic strike face application, the fracture toughness value of 9.7 MPa·m$^{1/2}$ for the titanium aluminide in the metal-ceramic composite disclosed in International PCT Application No. PCT/CA2017/050542 to Lumiant Corporation is quite low for metal alloys. Furthermore, as disclosed in International PCT Application No. PCT/CA2017/050542 to Lumiant Corporation, the metal-ceramic composite is produced at a temperature which is near the melting point of aluminum. Generally, causing an uncontrolled exothermic reaction between aluminum and titanium oxide at this temperature will cause excessive heat to be transferred to the tool, which will substantially shorten tool life. Furthermore, the large quantity of reactant aluminum required by Eq. 4, which is necessary to achieve an atomic percent of aluminum of 40% to 48% in the matrix alloy of the final metal-ceramic composite, causes the occurrence of excessive aluminum during the reaction which can melt or vaporize, and which can severely damage the tool, thereby substantially shortening tool life.

Improvements are generally desired. It is therefore desired to provide a novel synthetic titanium-corundum composite material, and a method of making the same.

SUMMARY

This section provides a general summary of the disclosure and is not a comprehensive disclosure of its full scope or all of its features.

It should be appreciated that this summary is provided to introduce a selection of concepts in a simplified form that are further described below in the detailed description. This summary is not intended to be used to limit the scope of the claimed subject matter.

The present disclosure relates to novel synthetic composites, notably titanium alloys coherently bonded with corundum, also known as synthetic titanium-corundum composites.

In an aspect of the present disclosure, a synthetic titanium-corundum composites can comprise a titanium alloy having an atomic aluminum percentage ranging from 0.5% to 24.5% and can be said to be characterized by exhibiting minimal porosity. For example, the porosity of the synthetic composites of the present disclosure can be 1% or less, rendering the synthetic composites of the present disclosure particularly useful to prepare articles that require integrity when exposed to substantial forces.

The synthetic titanium-corundum composites of the present disclosure can be manufactured by performing an uncontrolled exothermic chemical reaction. The reaction conditions can be constructed in such a manner that the synthetic titanium-corundum composites of the present disclosure achieve an uncontrolled exothermic chemical reaction at a relatively low temperature, and once formed, experience surprisingly few catastrophic material failures. This in contrast to composites known in the art, which require a higher temperature to achieve an uncontrolled exothermic chemical reaction, and as a result of residual stress exceeding the high temperature strength of the composite during cooling, frequently fail. Achieving an uncontrolled exothermic chemical reaction at a lower temperature is beneficial to tool life. Likewise, an atomic percent aluminum at or below 24.5% eliminates excess aluminum during the reaction, which can liquify or vaporize and attack the tool surface, thereby greatly reducing tool life. Thus, the manufacturing economics of the synthetic titanium-corundum composites provided in the present disclosure can be attractive.

In order to make the synthetic titanium-corundum composite of the present disclosure, an exothermic reaction using aluminum, titanium oxide, a low-temperature initiator, and a grain refiner as reactants can be performed. Accordingly, in a further aspect, the present disclosure provides a method of making a synthetic titanium-corundum composite. The method includes blending aluminum, titanium oxide, a low-temperature initiator, and a grain refiner in appropriate or desired quantities as to obtain a reactant mixture and heating the mixture to a temperature which is enough as to permit or support, but not immediately cause or initiate, an uncontrolled exothermic reaction between a portion of the aluminum and the low-temperature initiator, and which is not enough to permit an uncontrolled exothermic reaction between the aluminum and the titanium oxide at a compressive stress. The mixture is compressed such that an uncontrolled exothermic reaction between a portion of the aluminum and the low-temperature initiator occurs, thereby increasing the temperature of the mixture enough to cause an uncontrolled exothermic reaction between the remaining aluminum and the titanium oxide, with a rate of reaction fast enough to inhibit or prevent the formation of undesirable intermediate titanium aluminide compounds while obtaining a hot synthetic titanium-corundum composite comprising a titanium alloy and a coherently bonded corundum phase. The atomic percentage of aluminum in the titanium alloy ranges from 0.5% to 24.5%, the titanium alloy comprises one or more of the α-titanium, β-titanium, and $α_2$-titanium phases, and the volume fraction of the corundum phase ranges from 39% to 62%. The synthetic titanium-corundum composite is held for a time, and at a temperature, which in combination provide for or allow transformation of the titanium alloy such that the alloy comprises solely an α-titanium solid solution phase (Type A) or solely a β-titanium solid solution phase (Type B). The synthetic titanium-corundum composite is cooled to room temperature, or about 25° C., to obtain a synthetic titanium-corundum composite. In some variations of the present disclosure, the Type-A synthetic titanium-corundum composite is tempered for a time, and at a temperature, which in combination result in precipitation of a desired amount of $α_2$-titanium phase in the titanium alloy.

In further accordance with various aspects of the present disclosure, the rate of reaction for the reactant mixture is a function of a solid-state reaction model, and the solid-state reaction model is a function of temperature and compressive stress.

As is understood by those of ordinary skill in the art, and in accordance with various aspects of the present disclosure, it is advantageous with regard to the mechanical properties of final synthetic titanium-corundum composite for the corundum phase to have a refined grain structure.

The synthetic titanium-corundum composites of the present disclosure can be said to be characterized by having a very low porosity, notably about 1% or less. The composites of the present disclosure can be used to make a wide range of articles of manufacture, including articles of manufacture. The article of manufacture can be selecting from the group comprising automotive parts, aeronautical parts, and armory parts.

Accordingly, in one aspect there is provided a synthetic titanium-corundum composite, comprising: a titanium alloy; and a coherently bonded corundum phase, wherein the titanium alloy comprises at least one elemental titanium solid solution, and wherein the atomic percentage of aluminum in the titanium alloy ranges from 0.5% to 24.5%.

At least one of the elemental titanium solid solutions may be α-titanium. At least one of the elemental titanium solid solutions may be β-titanium. The remaining titanium alloy may comprise $α_2$-titanium.

The titanium alloy may contain one or more of the alloying elements bismuth (Bi), boron (B), carbon (C), chromium (Cr), iron (Fe), manganese (Mn), molybdenum (Mo), nickel (Ni), niobium (Nb), palladium (Pd), ruthenium (Ru), silicon (Si), tin (Sn), vanadium (V), and zirconium (Zr).

The volume percentage of corundum may range from 39% to 62%.

The composite may have a mean fracture toughness value greater than about 15 MPa·m½. The composite may have a mean fracture toughness value between about 15 and about 40 MPa·m½. The composite may have a mean fracture toughness value between about 21 and about 24 MPa·m½.

The mean size of the corundum grains may be about 50 µm or less. The porosity may be about 1% or less.

In one form of the present disclosure, the composite may be used in an article of manufacture. The article of manufacture may be selected from the group comprising an automotive part, an aeronautical part, and an armory part.

In another aspect, there is provided a method of making a synthetic titanium-corundum composite, the synthetic titanium-corundum composite comprising a titanium alloy and a coherently bonded corundum phase, wherein the titanium alloy comprises at least one elemental titanium solid solution, and wherein the atomic percentage of aluminum in the titanium alloy ranges from 0.5% to 24.5%, the method comprising: providing a mixture of reactant aluminum, titanium oxide, at least one low-temperature initiator, and at least one grain refiner in appropriate quantities. The method includes first heating the mixture to a temperature which is enough to permit, but not immediately cause, an uncontrolled exothermic reaction between a portion of the aluminum and the low-temperature initiator, and which is not enough to cause a reaction between the aluminum and the titanium oxide at a critical compressive stress associated with the aluminum and low-temperature initiator. Stated differently, in some variations of the present disclosure, the method includes heating the mixture to a first temperature that is sufficient to support, but not initiate, an uncontrolled exothermic reaction between a portion of the aluminum and the low-temperature initiator. The method also includes compressing the mixture to cause or initiate the uncontrolled exothermic reaction between a portion of the aluminum and the low-temperature initiator such that heating of the mixture to another temperature which causes or initiates the uncontrolled exothermic reaction between the remaining aluminum and the titanium oxide is provided, thereby obtaining a synthetic titanium-corundum composite. The synthetic titanium-corundum composite is held for a time, and a temperature, which in combination develop a stable elemental titanium solid solution in the titanium alloy, and the synthetic titanium-corundum composite is cooled to room temperature to obtain a final synthetic titanium-corundum composite.

The step of providing the mixture may further comprise providing the reactant aluminum, titanium oxide, a low-temperature initiator, and a grain refiner in particulate form. The step of providing the mixture may further comprise blending the particulates.

The step of providing the mixture may further comprise compacting the particulates. The step of providing the mixture may comprise subjecting the particulates to a vacuum during compacting. The step of providing the mixture may comprise heating the particulates prior to or during compacting.

The titanium oxide may be provided in any chemical compound form which comprises elemental titanium (Ti) and elemental oxygen (O), and which is capable of an uncontrolled exothermic reaction with aluminum.

The titanium oxide may be selected from the group of chemical compounds comprising titanium dioxide ($TiO_2$), tetratitanium heptaoxide ($Ti_4O_7$), trititanium pentoxide ($Ti_4O_7$), dititanium trioxide ($Ti_2O_3$), titanium monoxide (TiO), and any of the Magneli phase forms of titanium oxide, including $Ti_5O_9$, $Ti_6O_{11}$, $Ti_7O_{13}$, $Ti_8O_{15}$, $Ti_9O_{17}$, $Ti_{10}O_{19}$.

At least one low-temperature initiator may be selected from the group comprising nickel (Ni), diiron trioxide ($Fe_2O_3$), or dimanganese trioxide ($Mn_2O_3$).

At least one grain refiner may be selected from the group comprising cesium dioxide ($CeO_2$), hafnium dioxide ($HfO_2$), dilanthanum trioxide ($La_2O_3$), dineodymium trioxide ($Nd_2O_3$), disamarium trioxide ($Sm_2O_3$), diyttrium trioxide ($Y_2O_3$), zirconium dioxide ($ZrO_2$).

The method may further comprise adding at least one alloying element to the mixture selected from the group comprising bismuth (Bi), boron (B), carbon (C), chromium (Cr), iron (Fe), manganese (Mn), molybdenum (Mo), nickel (Ni), niobium (Nb), palladium (Pd), ruthenium (Ru), silicon (Si), tin (Sn), vanadium (V), and zirconium (Zr).

The step of first heating the mixture may comprise heating the mixture to a temperature less than 550° C.

The stable elemental titanium solid solution may be α-titanium or β-titanium. The synthetic titanium-corundum composite may be tempered for a time, and at a temperature, which in combination are enough to precipitate $α_2$-titanium inclusions in the elemental titanium solid solution.

The step of compressing may be performed using a tool and die. The tool and die may comprise tool steel. The surface of the tool steel may contact the reactant mixture and subsequent synthetic titanium-corundum composite may previously be treated with boron to develop a diffusion layer comprising one or more of the chemical compounds iron boride (FeB) or diiron boride ($Fe_2B$).

In one form, there is provided a synthetic titanium-corundum composite made in accordance with any aspects of this method.

The composite may have a mean fracture toughness value greater than about 15 MPa·m½. The composite may have a mean fracture toughness value between about 15 and about 40 MPa·m½. The composite may have a mean fracture toughness value between about 21 and about 24 MPa·m½.

The porosity may be about 1% or less.

There is also provided a use of the synthetic titanium-corundum composite in an article of manufacture. The article of manufacture may be selected from the group comprising an automotive part, an aeronautical part, and an armory part.

Other features and advantages of the present disclosure will become apparent from the following detailed description. It should be understood, however, that the detailed description, while indicating various forms of the disclosure, are given by way of illustration only, since various changes and modifications within the spirit and scope of the disclosure will become apparent to those of skill in the art from the detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
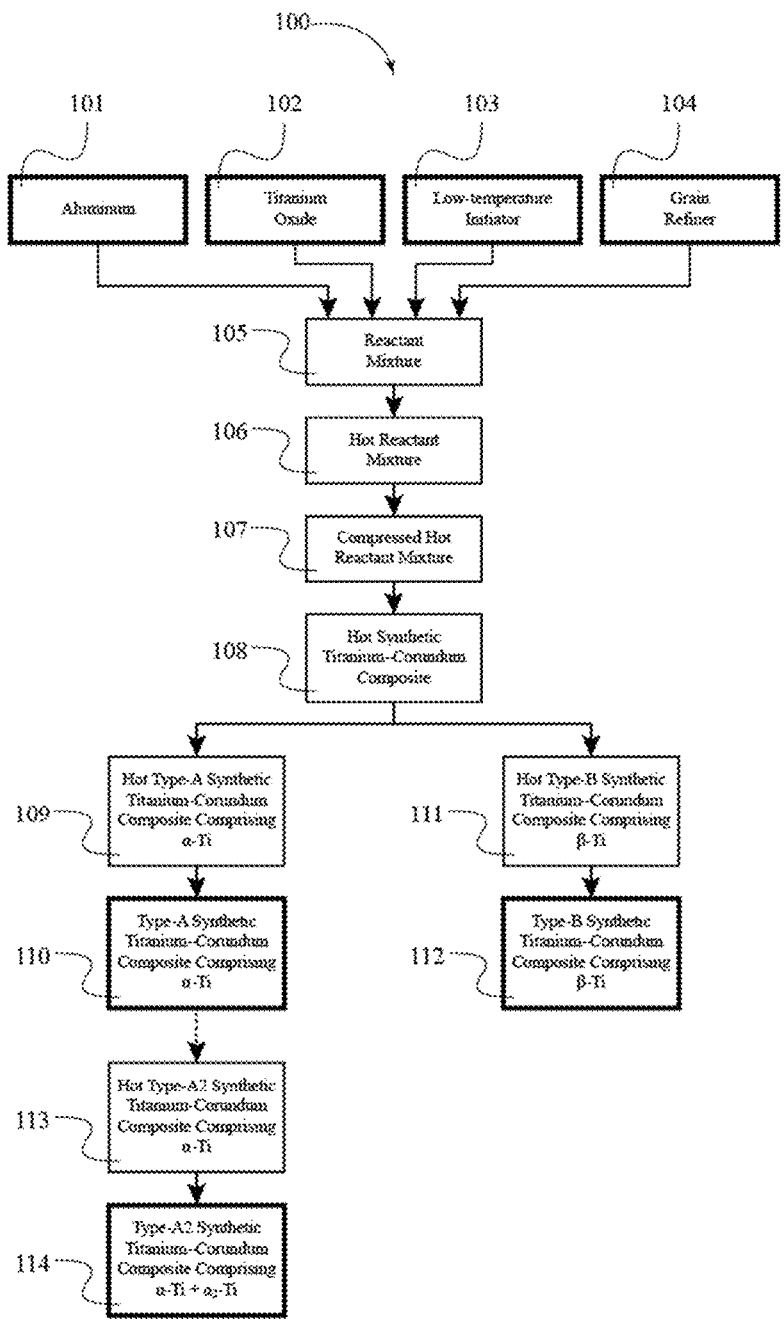
FIG. 1 is a schematic block diagram of a method for preparing a synthetic titanium-corundum composite comprising a titanium alloy and a coherently bonded corundum phase.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Various compositions, methods or processes will be described below to provide an example of forms or variations of each claimed subject matter. No form or variation described below limits any claimed subject matter and any claimed subject matter may cover processes, methods or compositions that differ from those described below. The claimed subject matter is not limited to compositions, methods or processes having all of the features of any one composition, method or process described below or to features common to multiple or all of the compositions, methods or processes described below. It is possible that a composition, method, or process described below is not a form or variation of any claimed subject matter. Any subject matter disclosed in a composition, method, or process described below that is not claimed in this document may be the subject matter of another protective instrument, for example, a continuing patent application, and the applicants, inventors or owners do not intend to abandon, disclaim or dedicate to the public any such subject matter by its disclosure in this document.

All patents and other publications identified are expressly incorporated in their entirety herein by reference for the purpose of describing and disclosing, for example, the methodologies described in such publications that might be used in connection with the teachings of the present disclosure. These publications are provided solely for their disclosure prior to the filing date of the present application. Nothing in this regard should be construed as an admission that the inventors are not entitled to antedate such disclosure by virtue of prior teachings or for any other reason. All statements as to the date or representation as to the contents of these documents are based on the information available to the applicants and does not constitute any admission as to the correctness of the dates or contents of these documents.

As used herein and in the claims, the singular forms, such as "a", "an" and "the" include the plural reference and vice versa unless the context clearly indicates otherwise. Throughout this specification, unless otherwise indicated, "comprise," "comprises" and "comprising" are used inclusively rather than exclusively, so that a stated integer or group of integers may include one or more other non-stated integers or groups of integers.

The term "or" is inclusive unless modified, for example, by "either."

When ranges are used herein for physical properties, such as molecular weight, or chemical properties, such as chemical formulae, all combinations and sub-combinations of ranges and specific forms or variations therein are intended to be included. Other than in the operating examples, or where otherwise indicated, all numbers expressing quantities of ingredients or reaction conditions used herein should be understood as modified in all instances by the term "about." The term "about," when referring to a number or a numerical range, means that the number or numerical range referred to is an approximation within experimental variability (or within statistical experimental error), and thus the number or numerical range may vary between 1% and 15% of the stated number or numerical range, as will be readily recognized by context. Furthermore, any range of values described herein is intended to specifically include the limiting values of the range, and any intermediate value or sub-range within the given range, and all such intermediate values and sub-ranges are individually and specifically disclosed (e.g. a range of 1 to 5 includes 1, 1.5, 2, 2.75, 3, 3.90, 4, and 5). Similarly, other terms of degree such as "substantially" and "approximately" as used herein mean a reasonable amount of deviation of the modified term such that the end result is not significantly changed. These terms of degree should be construed as including a deviation of the modified term if this deviation would not negate the meaning of the term it modifies.

Unless otherwise defined, scientific and technical terms used in connection with the formulations described herein shall have the meanings that are commonly understood by those of ordinary skill in the art. The terminology used herein is for the purpose of describing particular forms or variations only and is not intended to limit the scope of the present disclosure, which is defined solely by the claims.

The terms "α-titanium" and "β-titanium", as used herein, refer to solid solution phases of the element titanium (Ti).

The terms "trititanium aluminum" and "$α_2$-T", as may be used interchangeably herein, refer to the chemical compound consisting of titanium and aluminum having the chemical formula of $Ti_3Al$.

The term "β-transus temperature" and the symbol "$T_β$", as may be used interchangeably herein with reference to titanium alloys and titanium-aluminum phases, refer to the temperature above which a titanium and aluminum mixture exists exclusively in a solid solution of the β-titanium crystalline form. When material is cooled from a temperature above the β-transus temperature to below the β-transus temperature, it passes from the β-titanium phase field into a phase field in which the titanium does not exclusively exist in its β-titanium crystalline form.

The term "aluminum", as used herein, refers to the chemical element known by the name aluminum or aluminium in its elemental configuration.

The terms "corundum", "aluminum oxide", and "alumina", as may be used interchangeably herein, refer to the chemical compound dialuminum trioxide, having the chemical formula of $Al_2O_3$.

The term "titanium aluminide", as used herein, refers to any chemical compound, stable or metastable, comprising the elements of titanium (Ti) and aluminum (Al), including, but not limited to, compounds having the chemical formulas $TiAl_3$, $TiAl_2$, $TiAl$, and $Ti_3Al$.

The term "intermediate titanium aluminide", as used herein, refers to any titanium aluminide that is an unintended product of an uncontrolled exothermic reaction between aluminum and titanium.

The term "titanium oxide," as used herein, refers to any one of the chemical compounds consisting of titanium and oxygen from the group having the chemical formulas $TiO_2$, $TiO$, $Ti_2O_3$, $Ti_3O_5$, and $Ti_4O_7$.

The term "titanium dioxide," as used herein, refers to the chemical compound consisting of titanium and oxygen having the chemical formula $TiO_2$.

The term "granule," as used herein, refers to an individual piece of matter or substance in the solid state, with a maximum dimension in any one direction not greater than 1 mm.

The term "particulate," as used herein, refers to any matter or substance comprising a collection of granules.

The term "mixture" as used herein, refers to a composition comprising at least two distinct chemical compounds. The compounds constituting the mixture can be more or less homogenously distributed. The term, as used herein with respect to particulate aluminum and particulate titanium oxide, is intended to broadly include any mixture that comprises titanium oxide and aluminum in any form or constitution. Mixtures can comprise solid compounds, for example particulate compounds, or liquid compounds or a combination of solid and liquid compounds.

The term "room temperature," as used herein, refers to the temperature range from 15° C. to 25° C.

Various chemical elements and chemical compositions can be referred herein interchangeably either by using one, two or three letter identifiers for chemical elements in accordance with the Periodic Table of Chemical Elements, or by using their full chemical name, such as: "boron" or "B", or "zirconium dioxide" or "$ZrO_2$".

In a broad aspect, the present disclosure relates to novel synthetic composites, notably titanium alloys coherently bonded with corundum, also known as synthetic titanium-corundum composites.

The synthetic titanium-corundum composites of the present disclosure comprise titanium alloys having atomic aluminum percentages ranging from 0.5% to 24.5% and can be said to be characterized by exhibiting minimal porosity. For example, the porosity of the synthetic composites of the present disclosure can be 1% or less, rendering the synthetic composites of the present disclosure particularly useful to prepare articles that require integrity when exposed to substantial forces.

The synthetic titanium-corundum composites of the present disclosure can be manufactured by performing an uncontrolled exothermic chemical reaction. The reaction conditions can be constructed in such a manner that the synthetic titanium-corundum composites of the present disclosure achieve an uncontrolled exothermic chemical reaction at a relatively low temperature, and once formed, experience surprisingly few catastrophic material failures. This in contrast to composites known in the art, which require a higher temperature to achieve an uncontrolled exothermic chemical reaction, and as a result of residual stress exceeding the high temperature strength of the composite during cooling, frequently fail. Achieving an uncontrolled exothermic chemical reaction at a lower temperature is beneficial to tool life. Likewise, an atomic percent aluminum at or below 24.5% eliminates excess aluminum during the reaction, which can liquify or vaporize and attack the tool surface, thereby greatly reducing tool life. Thus, the manufacturing economics of the synthetic titanium-corundum composites provided in the present disclosure can be attractive.

Accordingly, the present disclosure provides, in at least one form, a synthetic titanium-corundum composite, the composite comprising a titanium alloy and a coherently bonded corundum phase, and the titanium alloy comprising one or more titanium phases, wherein the atomic percentage of aluminum in the alloy ranges from 0.5% to 24.5%.

In some forms, the atomic percentage aluminum in the titanium alloy can be 0.5%. In some forms, the atomic percentage aluminum in the titanium alloy can range from 0.5% to 1.5% or about 1.5%. In some forms, the atomic percentage aluminum in the titanium alloy can be 1.5% or about 1.5%. In some forms, the atomic percentage aluminum in the titanium alloy can range from 1.5% or about 1.5% to 2.5% or about 2.5%. In some forms, the atomic percentage aluminum in the titanium alloy can be 2.5% or about 2.5%. In some forms, the atomic percentage aluminum in the titanium alloy can range from 2.5% or about 2.5% to 3.5% or about 3.5%. In some forms, the atomic percentage aluminum in the titanium alloy can be 3.5% or about 3.5%. In some forms, the atomic percentage aluminum in the titanium alloy can range from 3.5% or about 3.5% to 4.5% or about 4.5%. In some forms, the atomic percentage aluminum in the titanium alloy can be 4.5% or about 4.5%. In some forms, the atomic percentage aluminum in the titanium alloy can range from 4.5% or about 4.5% to 5.5% or about 5.5%. In some forms, the atomic percentage aluminum in the titanium alloy can be 5.5% or about 5.5%. In some forms, the atomic percentage aluminum in the titanium alloy can range from 5.5% or about 5.5% to 6.5% or about 6.5%. In some forms, the atomic percentage aluminum in the titanium alloy can be 6.5% or about 6.5%. In some forms, the atomic percentage aluminum in the titanium alloy can range from 6.5% or about 6.5% to 7.5% or about 7.5%. In some forms, the atomic percentage aluminum in the titanium alloy can be 7.5% or about 7.5%. In some forms, the atomic percentage aluminum in the titanium alloy can range from 7.5% or about 7.5% to 8.5% or about 8.5%. In some forms, the atomic percentage aluminum in the titanium alloy can be 8.5% or about 8.5%. In some forms, the atomic percentage aluminum in the titanium alloy can range from 8.5% or about 8.5% to 9.5% or about 9.5%. In some forms, the atomic percentage aluminum in the titanium alloy can be 9.5% or about 9.5%. In some forms, the atomic percentage aluminum in the titanium alloy can range from 9.5% or about 9.5% to 10.5% or about 10.5%. In some forms, the atomic percentage aluminum in the titanium alloy can be 10.5% or about 10.5%. In some forms, the atomic percentage aluminum in the titanium alloy can range from 10.5% or about 10.5% to 11.5% or about 11.5%. In some forms, the atomic percentage aluminum in the titanium alloy can be 11.5% or about 11.5%. In some forms, the atomic percentage aluminum in the titanium alloy can range from 11.5% or about 11.5% to 12.5% or about 12.5%. In some forms, the atomic percentage aluminum in the titanium alloy can be 12.5% or about 12.5%. In some forms, the atomic percentage aluminum in the titanium alloy can range from 12.5% or about 12.5% to 13.5% or about 13.5%. In some forms, the atomic percentage aluminum in the titanium alloy can be 13.5% or about 13.5%. In some forms, the atomic percentage aluminum in the titanium alloy can range from 13.5% or about 13.5% to 14.5% or about 14.5%. In some forms, the atomic percentage aluminum in the titanium alloy can be 14.5% or about 14.5%. In some forms, the atomic percentage aluminum in the titanium alloy can range from 14.5% or about 14.5% to 15.5% or about 15.5%. In some forms, the atomic percentage aluminum in the titanium alloy can be 15.5% or about 15.5%. In some forms, the atomic percentage aluminum in the titanium alloy can range from 15.5% or about 15.5% to 16.5% or about 16.5%. In some forms, the atomic percentage aluminum in the titanium alloy can be 16.5% or about 16.5%. In some forms, the atomic percentage aluminum in the titanium alloy can range from 16.5% or about 16.5% to 17.5% or about 17.5%. In some forms, the atomic percentage aluminum in the titanium alloy can be 17.5% or about 17.5%. In some forms, the atomic percentage aluminum in the titanium alloy can range from 17.5% or about 17.5% to 18.5% or about 18.5%. In some forms, the atomic percentage aluminum in the titanium alloy can be 18.5% or about 18.5%. In some forms, the atomic percentage aluminum in the titanium alloy can range from 18.5% or about 18.5% to 19.5% or about 19.5%. In some forms, the atomic percentage aluminum in the titanium alloy can be 19.5% or about 19.5%. In some forms, the atomic percentage aluminum in the titanium alloy can range from 19.5% or about 19.5% to 20.5% or about 20.5%. In some forms, the atomic percentage aluminum in the titanium alloy can be 20.5% or about 20.5%. In some forms, the atomic percentage aluminum in the titanium alloy can range from 20.5% or about 20.5% to 21.5% or about 21.5%. In some forms, the atomic percentage aluminum in the titanium alloy can be 21.5% or about 21.5%. In some forms, the atomic percentage aluminum in the titanium alloy can range from 21.5% or about 21.5% to 22.5% or about 22.5%. In some forms, the atomic percentage aluminum in the titanium alloy can be 22.5% or about 22.5%. In some forms, the atomic percentage aluminum in the titanium alloy can range from 22.5% or about 22.5% to 23.5% or about 23.5%. In some forms, the atomic percentage aluminum in the titanium alloy can be 23.5% or about 23.5%. In some forms, the atomic percentage aluminum in the titanium alloy can range from 23.5% or about 23.5% to 24.5% or about 24.5%. In some forms, the atomic percentage aluminum in the titanium alloy can be 24.5%.

In some forms, the titanium alloy can comprise an α-titanium solid solution phase. In some forms, the titanium alloy can comprise an β-titanium solid solution phase. In some forms, the titanium alloy can comprise an $\alpha_2$-titanium solid solution phase. In some forms, the titanium alloy can comprise an α-titanium phase and can be substantially free of any β-titanium or $\alpha_2$-titanium phases. In some forms, the titanium alloy can comprise an β-titanium phase and can be substantially free of any α-titanium or $\alpha_2$-titanium phases. In some forms, the titanium alloy can comprise an α-titanium phase and the β-titanium phase. In some forms, the titanium alloy can comprise an α-titanium phase and the $\alpha_2$-titanium phase. In some forms, the titanium alloy can comprise an α-titanium phase and both the β-titanium phase and the $\alpha_2$-titanium phase. In some forms, the titanium alloy can comprise a β-titanium phase and the $\alpha_2$-titanium phase.

In some forms, the titanium alloy can include additional alloying elements, including, but not limited to, one or more of bismuth (Bi), boron (B), carbon (C), chromium (Cr), iron (Fe), manganese (Mn), molybdenum (Mo), nickel (Ni), niobium (Nb), palladium (Pd), ruthenium (Ru), silicon (Si), tin (Sn), vanadium (V), and zirconium (Zr).

In some forms, the mean grain size of the corundum phase can be about 50 µm or less. In some forms, the mean grain size of the corundum phase can be about 10 µm or less. In some forms, the mean grain size of the corundum phase can be about 3 µm or less.

In some forms, the porosity of the synthetic titanium-corundum composite can be about 1% or less. In some forms, the porosity of the synthetic titanium-corundum composite can be about 0.5% or less. In some forms, the porosity of the synthetic titanium-corundum composite can be about 0.2% or less.

In order to make the synthetic titanium-corundum composite of the present disclosure, an exothermic reaction using aluminum, titanium oxide, a low-temperature initiator, and a grain refiner as reactants can be performed. Accordingly, in a further aspect, the present disclosure provides, in at least one form, a method of making a synthetic titanium-corundum composite, the composite comprising a titanium alloy and a coherently bonded corundum phase, wherein the atomic percentage of aluminum in the titanium alloy ranges from 0.5% to 24.5%, and the volume fraction of the corundum phase ranges from 39% to 62%; the method comprising: blending aluminum, titanium oxide, a low-temperature initiator, and a grain refiner in appropriate quantities as to obtain a reactant mixture; heating the mixture to temperature which is enough as to permit, but not immediately cause, an uncontrolled exothermic reaction between a portion of the aluminum and the low-temperature initiator, but which is not enough as to permit an uncontrolled exothermic reaction between the aluminum and the titanium oxide without a reduced compressive stress; compressing the mixture to cause an uncontrolled exothermic reaction between a portion of the aluminum and the low-temperature initiator, thereby increasing the temperature of the mixture enough to cause an uncontrolled exothermic reaction between the remaining aluminum and the titanium oxide, with a rate of reaction fast enough to inhibit or prevent the formation of undesirable intermediate titanium aluminide compounds; obtaining a hot synthetic titanium-corundum composite comprising a titanium alloy and a coherently bonded corundum phase, wherein the atomic percentage of aluminum in the titanium alloy ranges from 0.5% to 24.5%, the titanium alloy comprises one or more of the α-titanium, β-titanium, and α$_2$-titanium phases, and the volume fraction of the corundum phase ranges from 39% to 62%; holding the synthetic titanium-corundum composite for a time, and at a temperature, which in combination are enough to transform the titanium alloy such that the alloy comprises solely an α-titanium solid solution phase (Type A) or solely a β-titanium solid solution phase (Type B); cooling the synthetic titanium-corundum composite to room temperature, or about 25° C., to obtain a synthetic titanium-corundum composite; and optionally tempering the Type-A synthetic titanium-corundum composite for a time, and at a temperature, which in combination are enough to precipitate a desired amount of α$_2$-titanium phase in the titanium alloy.

Turning now to FIG. 1, in one form of the present disclosure, there is herein provided a method 100 for preparing a Type-A synthetic titanium-corundum composite 110, a Type-A2 synthetic titanium-corundum composite 112, or a Type-B synthetic titanium-corundum composite 112, each comprising a titanium alloy and a coherently bonded corundum phase. The method 100 can comprise a first step comprising the blending of particulate aluminum 101, particulate titanium oxide 102, a particulate low-temperature initiator 103, and a particulate grain refiner 104, wherein the particulate aluminum 101, the particulate titanium oxide 102, the particulate low-temperature initiator 103, and the particulate grain refiner 104 are provided in appropriate quantities, to form a reactant mixture 105 comprising particulate aluminum, particulate titanium oxide, a particulate initiator, and a particulate grain refiner. The method 100 can next comprise a second step comprising the heating of the reactant mixture 105 to obtain a hot reactant mixture 106 at a temperature sufficiently high as to permit, but not immediately cause, a portion of the aluminum to react with the low-temperature initiator in an uncontrolled exothermic reaction. The method 100 can next comprise a third step comprising the compressing of the particulate mixture to obtain a compressed hot reactant mixture 107, and to cause a rate of reaction between a portion of the aluminum and the low-temperature initiator which is sufficiently high as to cause an uncontrolled exothermic reaction, thereby increasing the temperature of the mixture enough to cause an uncontrolled exothermic reaction between the remaining aluminum and the titanium oxide, with a rate of reaction fast enough to inhibit or prevent the formation of undesirable intermediate titanium aluminide compounds, and thereby obtain a hot synthetic titanium-corundum composite 108 comprising a titanium alloy and a coherently bonded corundum phase, wherein the atomic percentage of aluminum in the titanium alloy ranges from 0.5% to 24.5%, the titanium alloy comprises one or more of the α-titanium, β-titanium, and α$_2$-titanium phases, and the volume fraction of the corundum phase ranges from 39% to 62%. The method 100 can next comprise a fourth step comprising holding the synthetic titanium-corundum composite for a time, and at a temperature, which in combination are enough to obtain a hot Type-A synthetic titanium-corundum composite 109 or a hot Type-B synthetic titanium-corundum composite 111. The method 100 can next comprise a fifth step comprising cooling the hot Type-A synthetic titanium-corundum composite 109 or the hot Type-B synthetic titanium-corundum composite 111 to room temperature, or about 25° C., to obtain either a Type-A synthetic titanium-corundum composite 110 or the Type-B synthetic titanium-corundum composite 112. The method 100 can next optionally comprise a sixth step comprising tempering the Type-A synthetic titanium-corundum composite 110 for a time, and at a temperature, which in combination are enough to precipitate a desired amount of α$_2$-titanium phase in the titanium alloy and obtain a hot Type-A2 synthetic titanium-corundum composite 113, and cooling the hot Type-A2 synthetic titanium-corundum composite 113 to room temperature, or about 25° C., to obtain a Type-A2 synthetic titanium-corundum composite 114.

Figure 2:
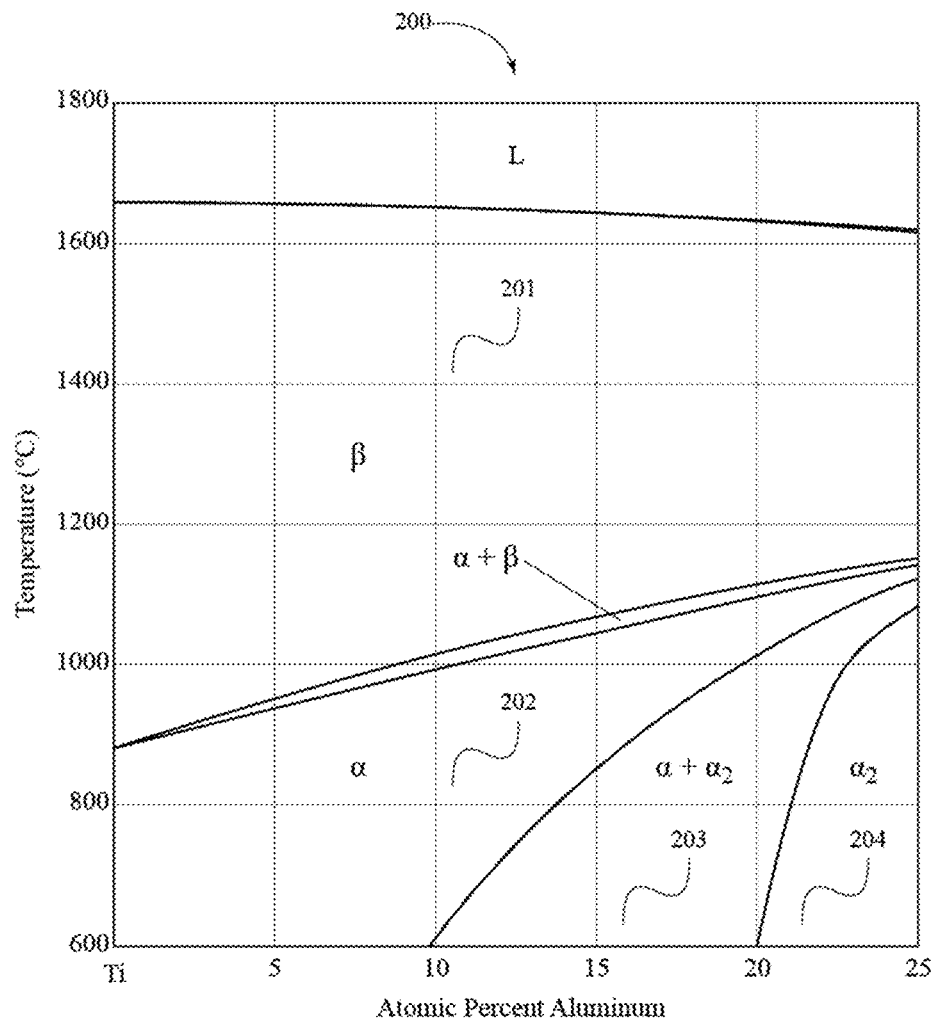
FIG. 2 is a graphical plot of a portion of the titanium-aluminum binary phase diagram having atomic percent aluminum ranging from 0% to 25%, and temperature ranging from 600° C. to 1800° C.

According to various forms of the present disclosure, a Type-A, Type-A2, or Type-B synthetic titanium-corundum composite comprising a titanium alloy and a coherently bonded corundum phase can be manufactured using a process illustrated in FIG. 1. The determining factor for obtaining a Type-A, Type-A2, or Type-B synthetic titanium-corundum composite is the atomic percent aluminum in the titanium alloy. Now referring to FIG. 2, the titanium-aluminum binary phase diagram 200 shows the thermodynamically stable phases for atomic percent aluminum ranging from 0%, i.e. pure titanium, to 25%, and for the temperature range from 600° C. to 1800° C. According to one form of the present disclosure, a Type-A synthetic titanium-corundum composite can be manufactured with an atomic percent aluminum ranging from 0.5% to 24.5%, for example with an atomic percent aluminum ranging from 0.5% to about 9%, by holding the hot synthetic titanium-corundum composite for a time, and at a temperature within the α-titanium phase field 202, which in combination are enough to transform the titanium alloy such that the alloy comprises solely an α-titanium solid solution phase. According to an form of the present disclosure, a Type-B synthetic titanium-corundum composite can be manufactured with an atomic percent aluminum ranging from 0.5% to 24.5%, by holding the hot synthetic titanium-corundum composite for a time, and at a temperature within the β-titanium phase field 201, which in combination are enough to transform the titanium alloy such that the alloy comprises solely an β-titanium solid solution phase. According to an form of the present disclosure, a Type-A2 synthetic titanium-corundum composite can be manufactured with an atomic percent aluminum ranging from about 9% to 24.5%, by tempering the hot Type-A synthetic titanium-corundum composite for a time, and at a temperature within the $(\alpha+\alpha_2)$-titanium phase field 203, or the $\alpha_2$-titanium phase field 204, which in combination are enough to transform the titanium alloy such that the alloy comprises $\alpha_2$-titanium precipitates in the α-titanium matrix.

Figure 3:
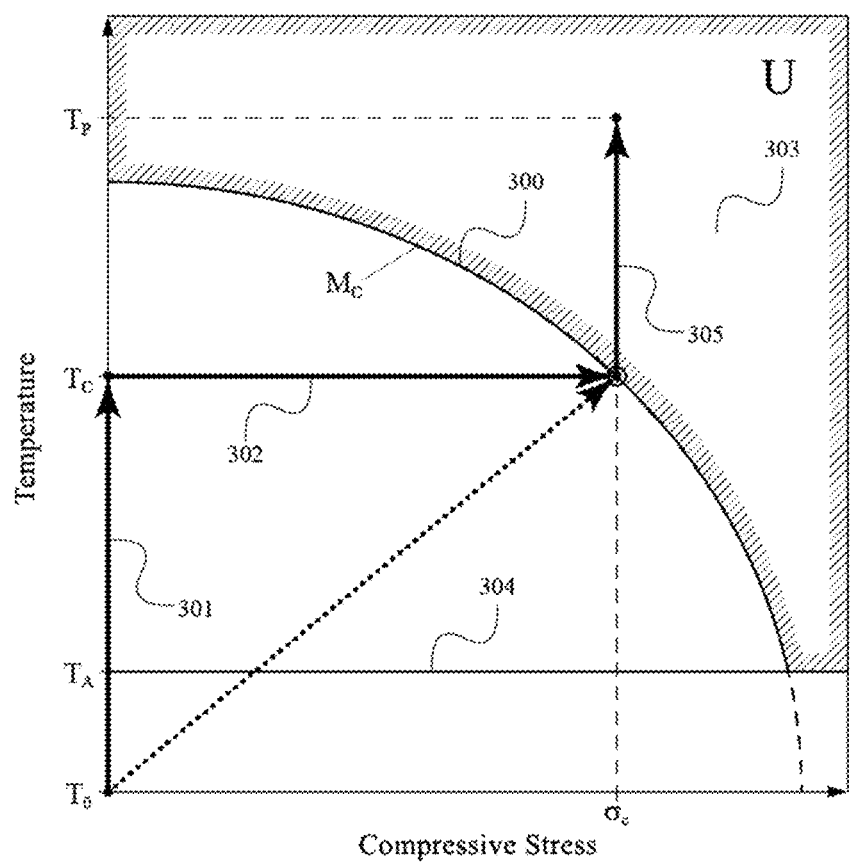
FIG. 3 is a graphical plot of a critical reaction model for a solid-state particulate reactant mixture, wherein the mixture is first heated to the critical temperature and then compressed to the critical compressive stress, in order to cause an uncontrolled exothermic reaction.
Figure 4:
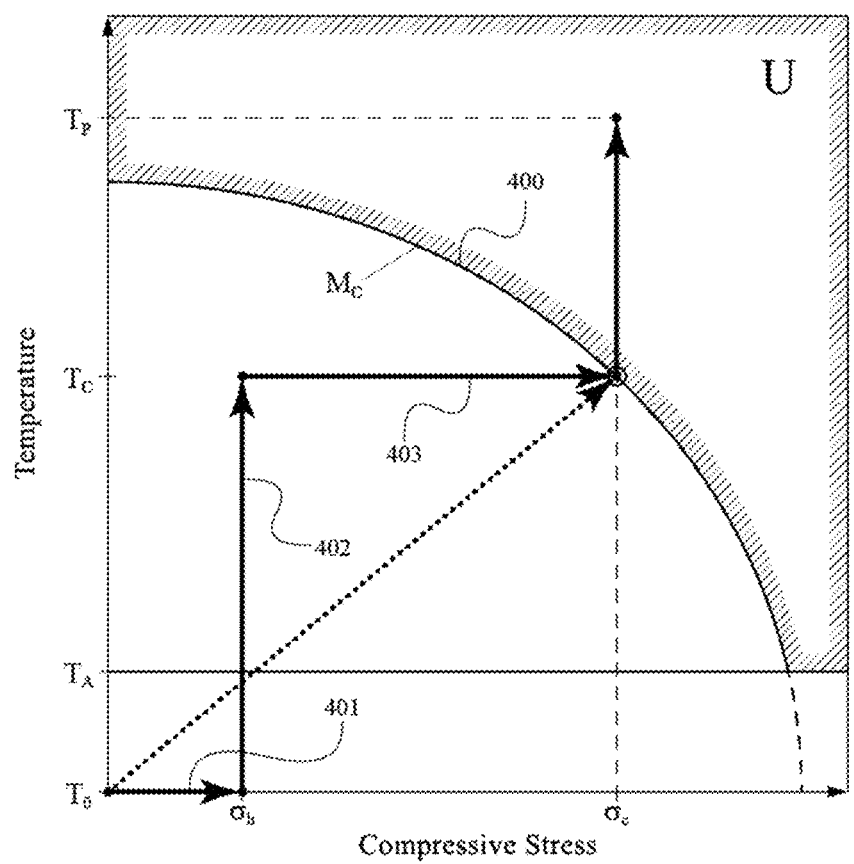
FIG. 4 is a graphical plot of another critical reaction model for a solid-state particulate reactant mixture, wherein the mixture is first compressed at a low compressive stress in order to increase heat conduction to the reactant mixture, then heated to the critical temperature, and then further compressed to the critical compressive stress, in order to cause an uncontrolled exothermic reaction.
Figure 5:
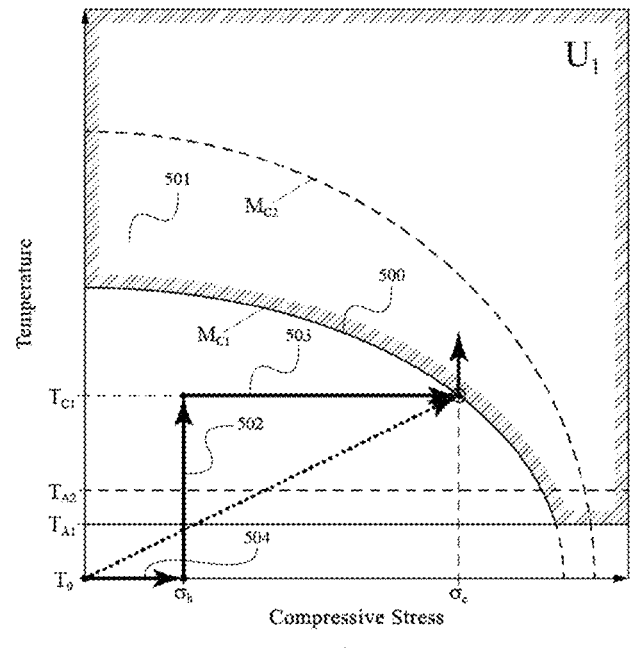
FIG. 5 is a graphical plot of still another critical reaction model for a solid-state particulate reactant mixture, wherein the function of a low-temperature initiator is illustrated in an example pathway to cause an uncontrolled exothermic reaction.
Figure 5:
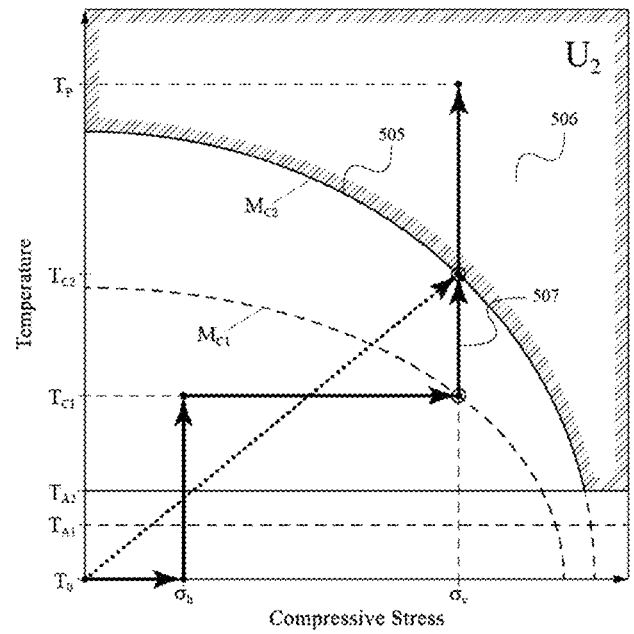

In further accordance with various forms of the present disclosure, the rate of reaction for the reactant mixture is a function of a solid-state reaction model, and the solid-state reaction model is a function of temperature and compressive stress. Referring now to FIG. 3, there exists therefore a critical reaction model 300, which is a vector of the critical temperature 301 and critical compressive stress 302, and which defines the boundary beyond which an uncontrolled exothermic reaction will occur, henceforth referred to as the uncontrolled exothermic reaction zone 303. The uncontrolled exothermic reaction zone is at the lower limit further bound by the activation temperature 304, which is the temperature at which the energy stored in the reactant mixture exceeds the activation energy of the reaction. Any temperature that is above the activation temperature is sufficient to permit, but not necessarily cause, an uncontrolled exothermic reaction. In accordance with the method of making a synthetic titanium-corundum composite of the present disclosure, the reactant mixture may be heated to the critical temperature 301, which is sufficient to permit, but not cause, an uncontrolled exothermic reaction. The reactant mixture may subsequently be compressed to the critical compressive stress 302, thereby initiating an uncontrolled exothermic reaction and causing the hot synthetic titanium-corundum composite to reach a peak temperature 305. Referring now to FIG. 4, the critical reaction model 400 is not path-dependent; therefore, both heat and compressive stress may be applied to the reactant mixture in any amount and sequence until reaching the boundary which represents the critical reaction model 400. For example, a preheat compressive stress 401 may be applied to the reactant mixture in order to increase the thermal conductivity of the reactant mixture, and thereby decrease the amount of time necessary to obtain the critical temperature 402. Once the reactant mixture is at the critical temperature 402, the compressive stress can be increased to the critical compressive stress 403, thereby causing an uncontrolled exothermic reaction between the aluminum and the titanium oxide. Referring now to FIG. 5, and in accordance with a form of the present disclosure, the inclusion of a low-temperature initiator provides for a first critical reaction model 500, a first uncontrolled exothermic reaction zone 501, a first critical temperature 502, and a critical compressive stress 503 with regard to a reaction between a portion of the aluminum and the low-temperature initiator. The remaining aluminum and the titanium oxide provide for a second critical reaction model 505, a second critical reaction zone 506, and a second critical temperature 507. The sequential application of the preheat compressive stress 504, the first critical temperature 502, and the critical compressive stress 503 cause an uncontrolled exothermic reaction between a portion of the aluminum and the low-temperature initiator, which in turn provides the heat necessary to reach the second critical temperature 507, thereby causing a subsequent uncontrolled exothermic reaction between the remaining aluminum and the titanium oxide and producing a hot synthetic titanium-corundum composite.

In some forms, more than one low-temperature initiator may be used in order to produce a series of uncontrolled exothermic reactions, whereby each uncontrolled exothermic reaction increases the temperature of the reactant mixture and causes the next uncontrolled exothermic reaction, until the temperature of the reactant mixture is increased enough to ultimately cause an uncontrolled exothermic reaction between the remaining aluminum and the titanium oxide.

It is advantageous with regard to the mechanical properties of final synthetic titanium-corundum composite for the corundum phase to possess a refined grain structure. Specifically, the corundum grain structure can have a mean grain size of 100 μm or less, for example a mean grain size of 35 μm or less, or a mean grain size of 10 μm or less, or a mean grain size of 3 μm or less. In accordance with the method of the present disclosure, a chemical compound which acts as a grain refiner can be included in the reactant mixture for the purpose of refining the corundum phase grain structure.

To initiate the methods of the present disclosure, in some forms hereof, aluminum particulate can be provided or obtained. In some forms, the aluminum particulate can be provided in a more or less pure unalloyed elemental form, for example, industrial grade aluminum can be provided. Aluminum purity levels can vary somewhat but generally highly pure forms of aluminum, for example, substantially pure unalloyed aluminum having a purity of about 99.9%, or about 99.99%. In other forms, aluminum is provided in the form of an aluminum alloy. Alloying elements that can be used in accordance herewith include bismuth (Bi), boron (B), carbon (C), chromium (Cr), iron (Fe), manganese (Mn), silicon (Si), tin (Sn), vanadium (V), and zirconium (Zr). In some forms, the alloying elements can be provided in such amounts that the combined percentage of the alloying elements does not exceed about 10% by weight of the aluminum alloy. For example, alloying elements can be provided in such amounts that the combined percentage does not exceed about 5% by weight of the aluminum alloy.

In accordance with the present disclosure, the granule size of the aluminum particulate can vary. In some forms, the granule size of aluminum is substantially larger than the granule size of the titanium oxide particulate. In some forms, aluminum particulate can be selected to have a mean granule size larger than about 1 μm and smaller than about 100 μm, for example between about 5 μm and about 20 μm. In some variations of the present disclosure the aluminum particulate is selected to be homogenously sized, i.e. the granules have a tightly centered mean granule size, e.g. a granule size wherein 90% of the granules have a granule size not exceeding ±20% of the mean granule size, for example, not exceeding ±10% or not exceeding ±5% of the mean granule size.

In accordance herewith, in one aspect of some forms of the methods of the present disclosure, titanium oxide particulate can be provided or obtained. In some forms, titanium oxide is provided in the form of more or less pure titanium oxide in particulate form, for example, industrial grade titanium oxide. Purity levels of the titanium oxide can vary but can be at least about 98%. The size of the titanium oxide granules can vary, however, as hereinbefore noted, in some forms the titanium oxide granule size is selected to be substantially smaller than the aluminum granule size. In some forms, the titanium oxide granule size can be at least one tenth; at least one twentieth; at least one twenty-fifth or at least one fiftieth of the aluminum granule size. In some forms, titanium oxide granules are selected to have a granule size larger than about 0.1 µm and smaller than about 1 µm, for example between about 0.3 µm and about 0.5 µm. In some variations, the titanium oxide granules are selected to be homogenously sized, i.e. the granules have a tightly centered mean granule size, e.g. a granule size wherein 90% of the granules have a granule size not exceeding ±20% of the mean granule size, or not exceeding ±10% of the mean granule size, or not exceeding ±5% of the mean granule size.

In further accordance herewith, in some forms, the titanium oxide particulate provided or obtained is titanium dioxide, with the chemical formula $TiO_2$. In some forms, the titanium oxide provided or obtained is tetratitanium heptaoxide, with the chemical formula $Ti_4O_7$. In some forms, the titanium oxide provided or obtained is trititanium pentoxide, with the chemical formula $Ti_3O_5$. In some forms, the titanium oxide provided or obtained is dititanium trioxide, with the chemical formula $Ti_2O_3$. In some forms, the titanium oxide provided or obtained is titanium monoxide, with the chemical formula TiO. In some forms, the titanium oxide provided or obtained is a Magneli phase titanium oxide of the form $Ti_nTi_{2n-1}$, including $Ti_5Ti_9$, $Ti_6Ti_{11}$, $Ti_7Ti_{13}$, $Ti_8Ti_{15}$, $Ti_9Ti_{17}$, and $Ti_{10}Ti_{19}$, which are based on, but are distinguishable from, the rutile $TiO_2$ crystal structure.

In some variations of the present disclosure, the titanium oxide particulate provided or obtained is titanium dioxide, and the titanium dioxide particulate can be provided in any mineral form. Mineral forms that can be used include, for example, anatase, rutile or brookite; however, titanium dioxide compositions comprising minimally about 95% rutile form can be used, for example minimally about 98% rutile form or about 100% rutile form.

Next, the aluminum, titanium oxide, low-temperature initiator, and grain refiner particulate can be contacted and mixed. In accordance herewith, the relative amounts of aluminum and titanium oxide used to prepare the mixture can vary, provided however, that the amounts of aluminum and titanium oxide are provided in off-stoichiometric quantities.

In some forms, the titanium oxide particulate provided or obtained is titanium dioxide, and the amounts of aluminum and titanium dioxide are provided in off-stoichiometric quantities with reference to the chemical reaction formulas:

$$3TiO_2+4Al \rightarrow 3Ti+2Al_2O_3-\Delta H \quad \text{(Eq. 18)}$$

and $$3TiO_2+5Al \rightarrow Ti_3Al+2Al_2O_3-\Delta H \quad \text{(Eq. 19)}$$

Hence, in some forms, the molar equivalents of aluminum and titanium dioxide reactants used to synthesize the titanium-corundum composite can range in accordance with the following formula:

$$9TiO_2+[12+x]Al \rightarrow [3(3-x)]Ti+[x]Ti_3Al+6Al_2O_3-\Delta H \quad \text{(Eq. 20)}$$

wherein x ranges from about 0.045 to about 2.92.

In some forms, the quantity of titanium dioxide used in the reactant mixture is 9.0 molar equivalents, the quantity of aluminum used in the reactant mixture can range from about 12.045 molar equivalents to about 14.92 molar equivalents.

In some forms, the combined quantity of α-titanium and β-titanium in the synthetic titanium-corundum composite can range from about 0.24 molar equivalents to about 8.87 molar equivalents, and the quantity of $\alpha_2$-titanium in the reaction product can range from about 0.045 molar equivalents to about 2.92 molar equivalents.

In some forms, the volume fraction of corundum in the synthetic titanium-corundum composite ranges from about 56% to about 62%.

In some forms, the density of the synthetic titanium-corundum composite ranges from about 4.07 g/cm³ to about 4.17 g/cm³.

In some forms, the titanium oxide particulate provided or obtained is tetratitanium heptaoxide, and the amounts of aluminum and tetratitanium heptaoxide are provided in off-stoichiometric quantities with reference to the chemical reaction formulas:

$$3Ti_4O_7+14Al \rightarrow 12Ti+7Al_2O_3-\Delta H \quad \text{(Eq. 21)}$$

and $$3Ti_4O_7+18Al \rightarrow 4Ti_3Al+7Al_2O_3-\Delta H \quad \text{(Eq. 22)}$$

Hence, in some forms, the molar equivalents of aluminum and tetratitanium heptaoxide reactants used to synthesize the titanium-corundum composite can range in accordance with the following formula:

$$3Ti_4O_7+[14+x]Al \rightarrow [3(4-x)]Ti+[x]Ti_3Al+7Al_2O_3-\Delta H \quad \text{(Eq. 23)}$$

wherein x ranges from about 0.060 to about 3.90.

In some forms, the quantity of tetratitanium heptaoxide used in the reactant mixture is 3.0 molar equivalents, the quantity of aluminum used in the reactant mixture can range from 14.060 molar equivalents to 17.90 molar equivalents.

In some forms, the combined quantity of α-titanium and β-titanium in the synthetic titanium-corundum composite can range from about 0.315 molar equivalents to about 11.82 molar equivalents, and the quantity of $\alpha_2$-titanium in the reaction product can range from about 0.060 molar equivalents to about 3.90 molar equivalents.

In some forms, the volume fraction of corundum in the synthetic titanium-corundum composite ranges from about 53% to about 58%.

In some forms, the density of the synthetic titanium-corundum composite ranges from about 4.08 g/cm³ to about 4.18 g/cm³.

In some forms, the titanium oxide particulate provided or obtained is trititanium pentoxide, and the amounts of aluminum and trititanium pentoxide are provided in off-stoichiometric quantities with reference to the chemical reaction formulas:

$$3Ti_3O_5+10Al \rightarrow 9Ti+5Al_2O_3-\Delta H \quad \text{(Eq. 24)}$$

and $$3Ti_3O_5+13Al \rightarrow 3Ti_3Al+5Al_2O_3-\Delta H \quad \text{(Eq. 25)}$$

Hence, in some forms, the molar equivalents of aluminum and trititanium pentoxide reactants used to synthesize the titanium-corundum composite can range in accordance with the following formula:

$$3Ti_3O_5+[10+x]Al \rightarrow [3(3-x)]Ti+[x]Ti_3Al+5Al_2O_3-\Delta H \quad \text{(Eq. 26)}$$

wherein x ranges from 0.045 to 2.92.

In some form, the quantity of trititanium pentoxide used in the reactant mixture is 3.0 molar equivalents, the quantity of aluminum used in the reactant mixture can range from 10.045 molar equivalents to 12.92 molar equivalents.

In some forms, the combined quantity of α-titanium and β-titanium in the synthetic titanium-corundum composite can range from about 0.240 molar equivalents to about 8.87 molar equivalents, and the quantity of $α_2$-titanium in the reaction product can range from about 0.045 molar equivalents to about 2.92 molar equivalents.

In some forms, the volume fraction of corundum in the synthetic titanium-corundum composite ranges from about 52% to about 57%.

In some forms, the density of the synthetic titanium-corundum composite ranges from about 4.08 g/cm³ to about 4.19 g/cm³.

In some forms, the titanium oxide particulate provided or obtained is dititanium trioxide, and the amounts of aluminum and dititanium trioxide are provided in off-stoichiometric quantities with reference to the chemical reaction formulas:

  (Eq. 27)

and

  (Eq. 28)

Hence, in some forms, the molar equivalents of aluminum and dititanium trioxide reactants used to synthesize the titanium-corundum composite can range in accordance with the following formula:

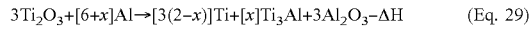  (Eq. 29)

wherein x ranges from 0.030 to 1.95.

In some form, the quantity of dititanium trioxide used in the reactant mixture is 3.0 molar equivalents, the quantity of aluminum used in the reactant mixture can range from 6.030 molar equivalents to 7.95 molar equivalents.

In some forms, the combined quantity of α-titanium and β-titanium in the synthetic titanium-corundum composite can range from about 0.159 molar equivalents to about 5.91 molar equivalents, and the quantity of $α_2$-titanium in the reaction product can range from about 0.030 molar equivalents to about 1.95 molar equivalents.

In some forms, the volume fraction of corundum in the synthetic titanium-corundum composite ranges from about 49% to about 55%.

In some forms, the density of the synthetic titanium-corundum composite ranges from about 4.09 g/cm³ to about 4.20 g/cm³.

In some forms, the titanium oxide particulate provided or obtained is titanium monoxide, and the amounts of aluminum and titanium monoxide are provided in off-stoichiometric quantities with reference to the chemical reaction formulas:

  (Eq. 30)

and

  (Eq. 31)

Hence, in some forms, the molar equivalents of aluminum and titanium monoxide reactants used to synthesize the titanium-corundum composite compound can range in accordance with the following formula:

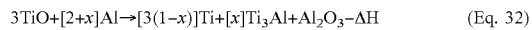  (Eq. 32)

wherein x ranges from 0.015 to 0.974.

In some form, the quantity of titanium monoxide used in the reactant mixture is 3.0 molar equivalents, the quantity of aluminum used in the reactant mixture can range from 2.015 molar equivalents to 2.974 molar equivalents.

In some forms, the combined quantity of α-titanium and β-titanium in the synthetic titanium-corundum composite can range from about 0.079 molar equivalents to about 2.96 molar equivalents, and the quantity of $α_2$-titanium in the reaction product can range from about 0.015 molar equivalents to about 2.96 molar equivalents.

In some forms, the volume fraction of corundum in the synthetic titanium-corundum composite ranges from about 39% to about 45%.

In some forms, the density of the synthetic titanium-corundum composite ranges from about 4.11 g/cm³ to about 4.26 g/cm³.

In summary, as per the above described forms, the volume fraction of corundum in the synthetic titanium-corundum composite ranges from about 39% to about 62%.

In summary, as per the above described forms, the density of the reaction product ranges from about 4.07 g/cm³ to about 4.20 g/cm³.

In accordance herewith, in one aspect of some forms of the methods of the present disclosure, a low-temperature initiator can be provided or obtained. In some forms, the low-temperature initiator is provided in the form of more or less pure particulate. Purity levels of the low-temperature initiator can vary but are in some variations at least about 99%. The size of the low-temperature initiator granules can vary; however, in some forms the low-temperature initiator granule size is selected to be substantially smaller than the titanium oxide granule size. In some forms, the low-temperature initiator granule size can be at least one fifth; at least one tenth; or at least one twentieth of the titanium oxide granule size. In some forms, low-temperature initiator granules are selected to have a granule size larger than about 0.03 μm and smaller than about 0.1 μm, for example between about 0.01 μm and about 0.03 μm. Also, in some variations the low-temperature initiator granules are selected to be homogenously sized, i.e. the granules can have a tightly centered mean granule size, e.g. a granule size wherein 90% of the granules have a granule size not exceeding ±20% of the mean granule size, or 90% of the granules have a granule size not exceeding ±10% of the mean granule size, or 90% of the granules have a granule size not exceeding not exceeding ±5% of the mean granule size. In some forms, the mass fraction of the particulate low-temperature initiator in the reactant mixture is 10% or less, for example 5% or less or 3% or less.

In some forms, particulate low-temperature initiators may be used, provided consideration is given to the critical temperature, reaction product, and heat of reaction relative to the reaction between a portion of the aluminum and the low-temperature initiator. The critical temperature is primarily a function of the mean granule size of the particulate low-temperature initiator and the mean granule size of the particulate aluminum. Other factors that can affect the critical temperature are sintering behavior of the low-temperature initiator at temperatures below the critical temperature, and the extent to which the particulate aluminum has been passivated. Generally, particulates with smaller mean granule sizes will result in lower critical temperatures due to increased total surface area and the increased number of contact points between the reactant granules. The particulate low-temperature initiator should be an elemental metal or a metallic oxide. When the low-temperature initiator reacts with a portion of the aluminum, the reaction product will include an aluminide compound, aluminum oxide (i.e. corundum), or both. Advantageously, the reaction product may also include an elemental metal, which, like any aluminide in the reaction product, will be incorporated into the titanium alloy of the synthetic titanium-corundum composite. The reaction between the low-temperature initiator and a portion of the aluminum should be exothermic and spontaneous under standard state conditions. If the low-temperature initiator is an elemental metal, the reaction between the low-temperature initiator and a portion of the aluminum will generally follow the reaction formula:

$$[a]M+[b]Al \rightarrow [c]M_iAl_j-\Delta H_a \quad \text{(Eq. 33)}$$

where a, b, c, and d are stoichiometric coefficients, i and j are the atomic subscripts of the aluminide compound, and $\Delta H_a$ is the heat of reaction per mole of reactant element metal. If the low-temperature initiator is a metal oxide, the reaction between the low-temperature initiator and a portion of the aluminum will generally follow the reaction formula:

$$[a]M_xO_y+[b]Al \rightarrow [c]M_i+[d]Al_2O_3-\Delta H_a \quad \text{(Eq. 34)}$$

or the reaction formula:

$$[a]M_xO_y+[b]Al \rightarrow [c]M_iAl_j+[d]Al_2O_3-\Delta H_a \quad \text{(Eq. 35)}$$

where x and y are the atomic subscripts of the reactant metal oxide compound, and $\Delta H_a$ is the heat of reaction per mole of reactant metal oxide compound. Therefore, when the mass fraction of the low-temperature initiator in the reactant mixture is less than 10%, the temperature of the reactants following the reaction between the low-temperature initiator and a portion of the aluminum can be estimated by:

$$T_R = T_{C1} + \frac{\Delta H_a w_I}{\overline{C}_P} \quad \text{(Eq. 36)}$$

where $T_R$ is the temperature of the reactants following the reaction between the low-temperature initiator and a portion of the aluminum, $w_I$ is the mass fraction of the low-temperature initiator in the reactant mixture, and $\overline{C}_P$ is the heat capacity of the remaining reactant mixture, which can be estimated by:

$$\overline{C}_P = \frac{1}{\left(\frac{w_T}{d_T}+\frac{w_A}{d_A}\right)} \cdot \left[\frac{w_T}{d_T} \cdot C_{P(T)} + \frac{w_A}{d_A} \cdot C_{P(A)}\right] \quad \text{(Eq. 37)}$$

where $w_T$ is the mass fraction, $d_T$ is the density, and $C_{P(T)}$ is the heat capacity of the titanium oxide, and $W_A$ is the mass fraction, $d_A$ is the density, and $C_{P(A)}$ is the heat capacity of the aluminum. Furthermore, in accordance with an form of the present disclosure, the temperature of the reactants following the reaction between the low-temperature initiator and a portion of the aluminum must be greater than the critical temperature of the reaction between the remaining aluminum and the titanium oxide; in other words:

$$T_R > T_{C2} \quad \text{(Eq. 38)}$$

In some forms, the particulate low-temperature initiator provided or obtained is nickel (Ni), and the reaction between nickel and a portion of the aluminum follows the formula:

$$Ni+Al \rightarrow NiAl-\Delta H_a \quad \text{(Eq. 39)}$$

In further accordance herewith, in some forms, the particulate low-temperature initiator provided or obtained is diiron trioxide, with the chemical formula $Fe_2O_3$, and the reaction between diiron trioxide and a portion of the aluminum follows the formula:

$$Fe_2O_3+2Al \rightarrow 2Fe+Al_2O_3-\Delta H_a \quad \text{(Eq. 40)}$$

In some forms, the particulate low-temperature initiator provided or obtained is dimanganese trioxide, with the chemical formula $Mn_2O_3$, and the reaction between dimanganese trioxide and a portion of the aluminum follows the formula:

$$Mn_2O_3+4Al \rightarrow 2MnAl+Al_2O_3-\Delta H_a \quad \text{(Eq. 41)}$$

In accordance herewith, in one aspect of some forms of the methods of the present disclosure, a grain refiner can be provided or obtained. In some forms, the grain refiner is provided in the form of more or less pure particulate. Purity levels of the grain refiner can vary but can be at least about 99%. The size of the grain refiner granules can vary; however, in some forms the grain refiner granule size is selected to be substantially smaller than the titanium oxide granule size. In some forms, the grain refiner granule size can be at least one fifth; at least one tenth; or at least one twentieth of the titanium oxide granule size. In some forms, grain refiner granules are selected to have a granule size larger than about 0.03 μm and smaller than about 0.1 μm, for example between about 0.01 μm and about 0.03 μm. And in some variations the grain refiner granules are selected to be homogenously sized, i.e. the granules have a tightly centered mean granule size, e.g. a granule size wherein 90% of the granules have a granule size not exceeding ±20% of the mean granule size, or 90% of the granules have a granule size not exceeding ±10% of the mean granule size, or 90% of the granules have a granule size not exceeding ±5% of the mean granule size. In some forms, the mass fraction of the particulate low-temperature initiator in the reactant mixture is 10% or less, for example 5% or less, or 3% or less.

In some forms, the grain refiner is cesium dioxide, with the chemical formula $CeO_2$. In some forms, the grain refiner is hafnium dioxide, with the chemical formula $HfO_2$. In some forms, the grain refiner is dilanthanum trioxide, with the chemical formula $La_2O_3$. In some forms, the grain refiner is dineodymium trioxide, with the chemical formula $Nd_2O_3$. In some forms, the grain refiner is disamarium trioxide, with the chemical formula $Sm_2O_3$. In some forms, the grain refiner is diyttrium trioxide, with the chemical formula $Y_2O_3$. In some forms, the grain refiner is zirconium dioxide, with the chemical formula $ZrO_2$.

In some forms, the particulate aluminum, or optionally particulate aluminum alloy, can be contacted with the particulate titanium oxide, the particulate low-temperature initiator, and the particulate grain refine, and the granules can be mixed or blended to obtain a more or less homogenous mixture comprising aluminum, titanium oxide, low-temperature initiator, and grain refiner granules. A mechanical device, for example, a mechanical milling device such as a ball mill, can be used to mix the particulates. In addition, in some forms, in order to facilitate mixing, the granules can be suspended in a liquid, for example in a solvent such as acetone. Contacting and mixing of the particulates can conveniently be performed at room temperature and in any suitable container.

In some forms, particulate aluminum, particulate titanium oxide, particulate low-temperature initiator, and particulate grain refiner can be blended and subsequently compacted. Such compacting can be achieved using a mechanical press tool and die, for example a metal sleeve for holding the particulate mixture and a cylinder that fits into the sleeve and can press the particulate. The amount of force applied can vary but is at a minimum enough force to cause the particulate mixture to bind into a solid body. In this regard a force from, for example, about 1 MPa to about 1,000 MPa can be applied, using for example a hydraulic pressure device. In other forms, a pelletizing device can be used to compact the power into, for example, pellets or spheres. In some forms, the mixture can be compacted at room temperature. In other forms, the mixture can be compacted at an elevated temperature, for example by heating the mixture to approximately 100° C., 200° C., 300° C., or 400° C. and thereafter exerting pressure on the heated mixture. In some forms, a vacuum may be applied to the mechanical press die, before or during the application of force, in order to remove air from the particulate mixture.

Figure 6:
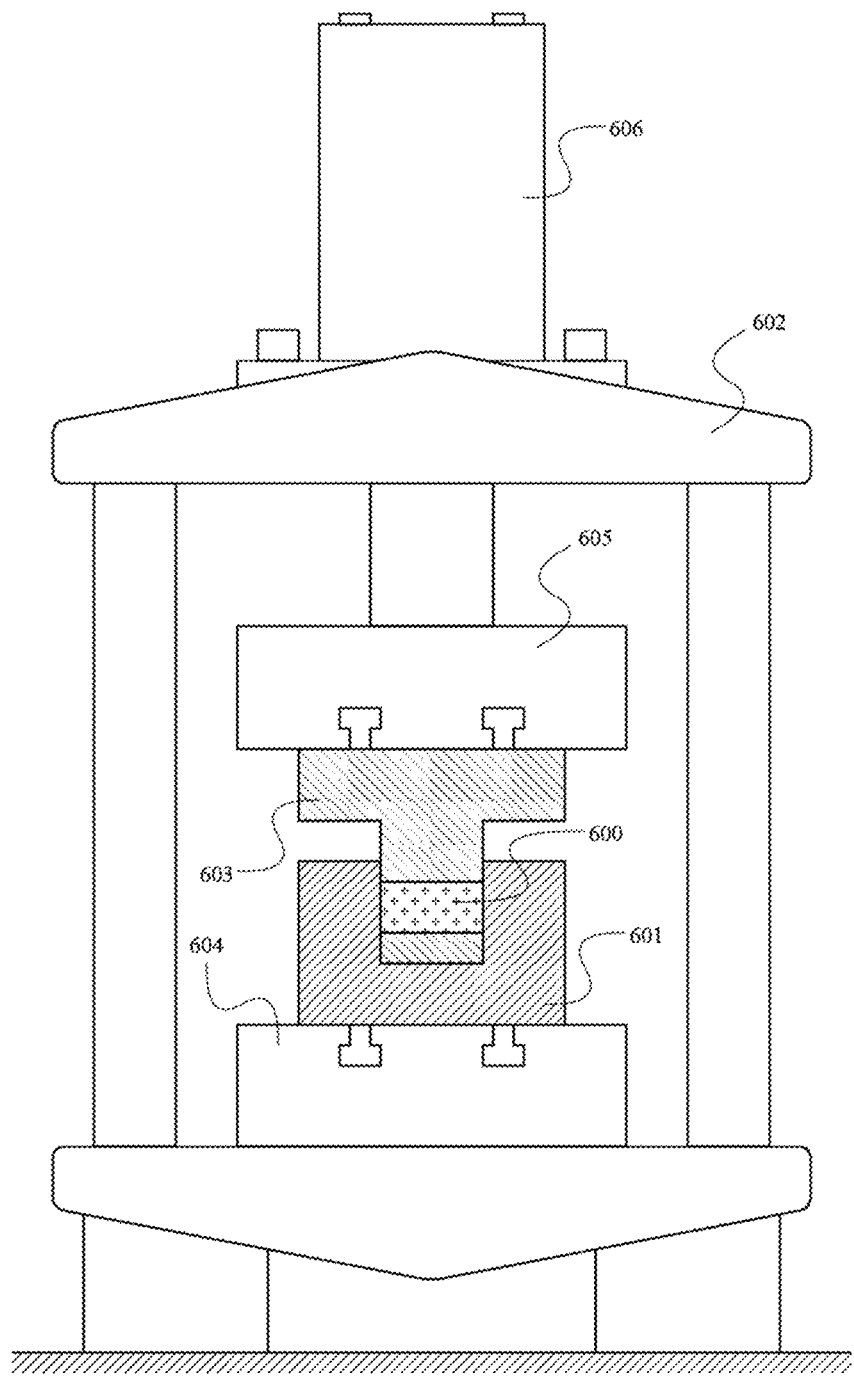
FIG. 6 is a schematic view of a mechanical pressing device.
Figure 7A:
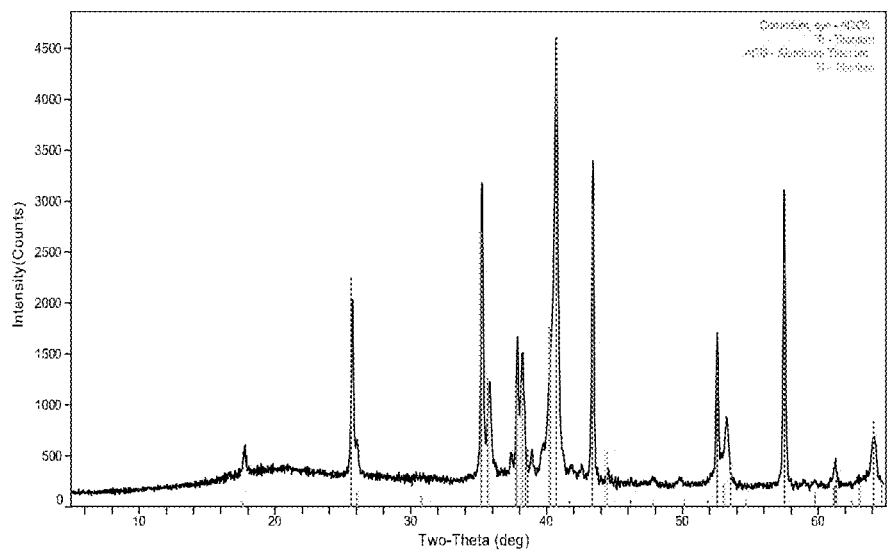
FIGS. 7A to 7E are graphical plots of X-ray diffractometry spectra of experimental synthetic titanium-corundum composite samples, in accordance with an example described herein.
Figure 7B:
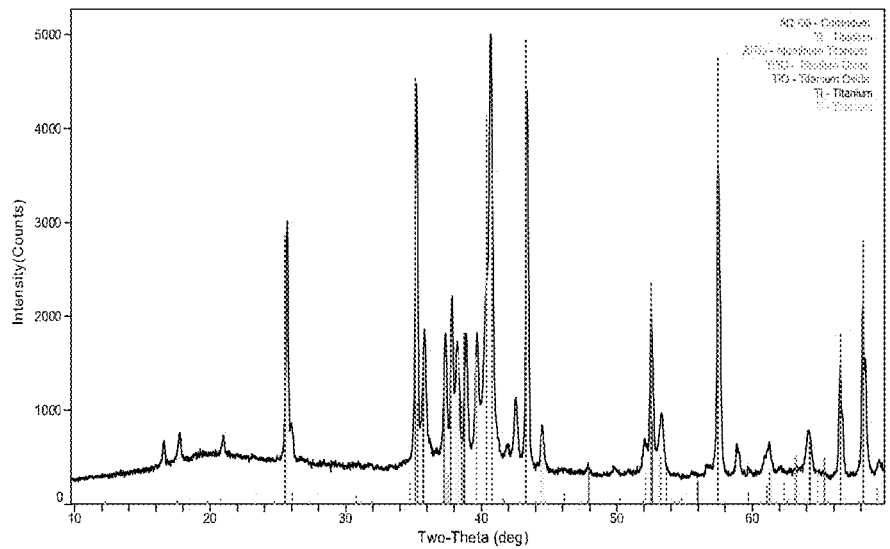
Figure 7C:
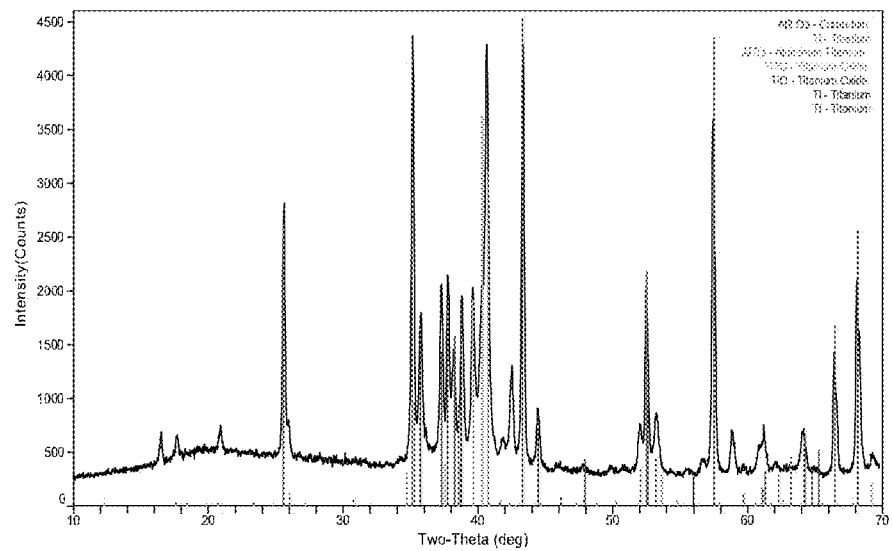
Figure 7D:
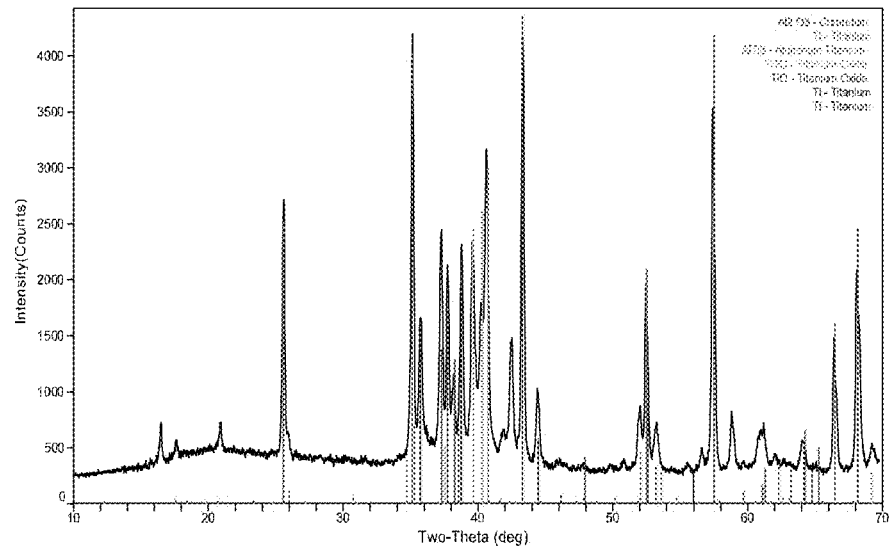
Figure 7E:
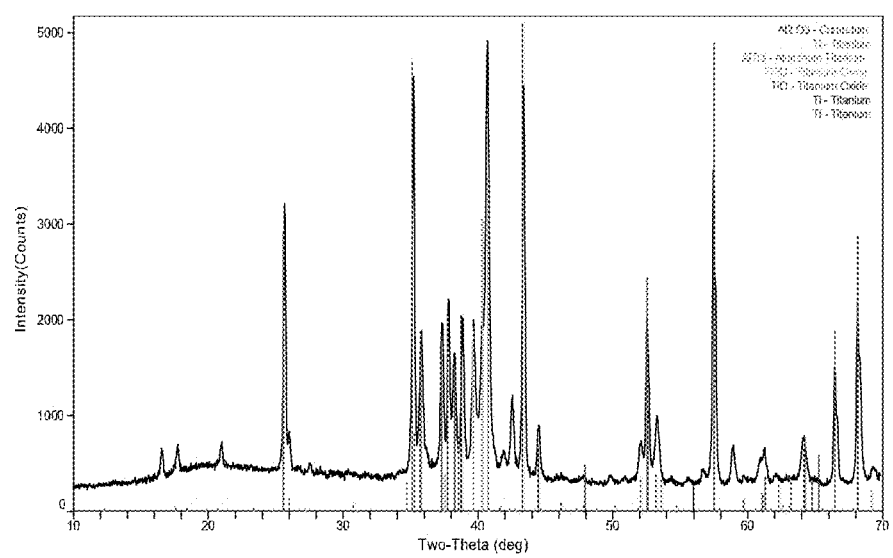

Next, the solid body formed from the particulate mixture can be heated to a temperature which is enough to permit, but not immediate cause, an uncontrolled exothermic reaction between a portion of the aluminum and the low-temperature initiator, but which is not enough to permit an uncontrolled exothermic reaction between the remaining aluminum and the titanium oxide, upon the application of compressive stress. In general, this involves increasing the temperature of the solid body to a temperature which is much less than the melting point of aluminum. The melting point of aluminum is about 660° C., and the melting points of aluminum alloys range from about 593° C. to about 816° C. In some forms, the solid body is heated to a temperature between 400° C. or about 400° C. and 450° C., in other forms to a temperature between 450° C. and 500° C., in other forms to a temperature between 500° C. and 550° C., and in still other forms to a temperature between 550° C. and 600° C. or about 600° C. In some forms, the solid body is heated in a furnace. In some forms, the atmosphere of the furnace is controlled, either as a vacuum or inert gas atmosphere. In some forms, referring now to FIG. 6, the solid body 600 is placed into a hot die 601, which is mounted to a mechanical pressing device 602 comprising a tool 603, a fixed platen 604, a movable platen 605, and a hydraulic cylinder 606. In some forms, to aid in the rapid heating of the solid body 600 inside the die 601, a light compressive stress may be applied with the tool 603 which is much less than the compressive stress necessary to cause an uncontrolled exothermic reaction between a portion of the aluminum and the low-temperature initiator, which will vary according to the solid body composition and the granule sizes of the particulate mixture constituents, with such an applied compressive stress causing an increase in the conductive heat transfer from the hot tool 603 and die 601 to the solid body 600. In some forms, the light compressive stress can be applied for a period of time which does not exceed 5 minutes, for example does not exceed 1 minute, or does not exceed 30 seconds. Next, with the solid body at a temperature which is enough as to permit, but not immediately cause, an uncontrolled exothermic reaction between a portion of the aluminum and the low-temperature initiator, but which is not enough to permit a reaction between the aluminum and the titanium oxide, a compressive stress is applied, or in some forms the compressive stress is increased, with the tool 603, to a compressive stress which is enough as to cause an uncontrolled exothermic reaction between a portion of the aluminum and the low-temperature initiator, during which time and for some time following, the compressive stress is maintained. Immediately following the reaction between a portion of the aluminum and the low-temperature initiator, the temperature of the solid body is increased, by virtue of the uncontrolled exothermic reaction between a portion of the aluminum and the low-temperature initiator, to a temperature which is enough to cause an uncontrolled exothermic reaction between the remaining aluminum and the titanium oxide, and whereby the compressive stress causes the consolidation and densification of the hot synthetic titanium-corundum composite, which is characterized by low porosity. In some forms, the compressive stress is maintained after the completion of the uncontrolled exothermic reaction between the remaining aluminum and the titanium oxide for about 30 seconds or more, in other forms the compressive stress is maintained for about 15 seconds. In at least one form the compressive stress is maintained for about 10 seconds, and in some forms the compressive stress is maintained for 5 seconds or less. Upon the release of the compressive stress, the hot synthetic titanium-corundum composite is removed from the die 601.

Next, with the titanium alloy in the hot synthetic titanium-corundum composite comprising one or more of the $\alpha$-titanium, $\beta$-titanium, and $\alpha_2$-titanium phases, the synthetic titanium-corundum composite may be subjected to further heat treatment in order to produce a final synthetic titanium-corundum composite comprising a titanium alloy with a desirable composition and microstructure. The final synthetic titanium-corundum composite, comprising a titanium alloy and a coherently bonded corundum phase, may be of the heretofore defined A, B, or A2 type, depending upon the composition of the titanium alloy. Accordingly, in at least one form and referring now to FIG. 2, a Type-A synthetic titanium-corundum composite can be manufactured with an atomic percent aluminum ranging from 0.5% to 24.5%, and in some variations with an atomic percent aluminum ranging from 0.5% to about 9%, by holding the hot synthetic titanium-corundum composite for a time, and at a temperature within the $\alpha$-titanium phase field 202, which in combination are enough to transform the titanium alloy such that the alloy comprises solely an $\alpha$-titanium solid solution phase. According to an form of the present disclosure, a Type-B synthetic titanium-corundum composite can be manufactured with an atomic percent aluminum ranging from 0.5% to 24.5%, by holding the hot synthetic titanium-corundum composite for a time, and at a temperature within the $\beta$-titanium phase field 201, which in combination are enough to transform the titanium alloy such that the alloy comprises solely an $\beta$-titanium solid solution phase. According to an form of the present disclosure, a Type-A2 synthetic titanium-corundum composite can be manufactured with an atomic percent aluminum ranging from about 9% to 24.5%, by tempering the hot Type-A synthetic titanium-corundum composite for a time, and at a temperature within the $(\alpha+\alpha_2)$-titanium phase field 203, or the $\alpha_2$-titanium phase field 204, which in combination are enough to transform the titanium alloy such that the alloy comprises $\alpha_2$-titanium precipitates in the $\alpha$-titanium matrix.

In some forms, again referring to FIG. 6, the surfaces of the tool 603 and die 601 which come in contact first with the solid body, and next with the hot synthetic titanium-corundum composite, may be treated, prior to use and in order to increase tool life, with elemental boron (B) to create a diffusion layer comprising iron boride (FeB), diiron boride ($Fe_2B$), or both.

In some forms, the herewith uncontrolled exothermic reaction conditions can be established to permit the temperature of the hot synthetic titanium-corundum composite to reach at least the $\beta$-transus temperature ($T_\beta$), for example, a temperature between about 885° C. and 1,155° C.; however temperatures as high as 1,600° C. can be reached.

In some forms, the temperature of the reaction mixture can be increased under ambient or atmospheric pressure.

In some forms, the temperature of the reaction mixture can be increased under pressure in excess of ambient pressure, for example by exerting a pressure of at least on 1 MPa, at least 10 MPa, at least 100 MPa or at least 1,000 MPa on the mixture, using for example a hydraulic press.

The synthetic titanium-corundum composites of the present disclosure comprise a titanium alloy and a coherently bonded corundum phase, with a volume fraction of the corundum phase ranging from 39% to 62%, which imparts high hardness to the composite, with the titanium alloy comprising one or both of the α-titanium and β-titanium phases, which impart high fracture toughness to the composite, and with the titanium alloy comprising an atomic percent of aluminum ranging from 0.5% to 24.5%, which does not cause the occurrence of excess aluminum during the uncontrolled exothermic reaction which can melt or vaporize and damage the tool. With the inclusion of the low-temperature initiator, the reaction occurs at a temperature which is substantially less than the melting point of aluminum, which avoids the substantial shortening of tool life.

Thus, it will be clear that the synthetic titanium-corundum composites of the present disclosure can be made by performing uncontrolled exothermic reactions. The techniques used to conduct an uncontrolled exothermic reaction in accordance herewith, including the arrangement of parts and tools, reaction conditions, details, and order of operation can be varied. Some techniques to conduct uncontrolled exothermic reactions that can be used, in accordance herewith, are detailed in U.S. Pat. No. 4,916,029 to Nagle et al.; U.S. Pat. No. 5,059,490 to Brupbacher et al.; U.S. Pat. No. 6,955,532 to Zhu et al.; International PCT Application Publication No. WO 02/053316 to Lintunen et al.; Horvitz et al., 2002, J. European Ceramic Society 22, 947-954; and International PCT Application Nos. PCT/CA2017/050540, PCT/CA2017/050542 and PCT/CA2017/050544 to Lumiant Corporation.

The quantities of α-titanium, β-titanium, $α_2$-titanium, and coherently bonded corundum phase can vary as a function of the atomic percentage of aluminum, as hereinbefore noted.

The solid composites of the present disclosure can be said to be characterized by having a very low porosity, notably about 2% or less for example, 1.0%, 0.9%, 0.8%, 0.7%, 0.6%, 0.5, 0.4%, 0.3%, 0.2% or 0.1%.

The composites of the present disclosure can be used to make a wide range of articles of manufacture, including articles of manufacture of any geometric dimensions, for example, by conducting the uncontrolled exothermic reaction in a die of desired geometric dimensions.

Accordingly, the present disclosure further includes a use of a synthetic titanium-corundum composite to make an article of manufacture, the composite comprising a titanium alloy and a coherently bonded corundum phase, and the titanium alloy comprising one or more of the α-titanium, β-titanium, and $α_2$-titanium phases, wherein the atomic percentage of aluminum in the alloy ranges from 0.5% to 24.5%.

In some forms, the article of manufacture can be an automotive part. In some forms, the article of manufacture can be an aeronautical part. In some forms, the article of manufacture can be an armory part.

As will be appreciated, the methods described herein can conveniently be used to manufacture synthetic titanium-corundum composites comprising a titanium alloy and a coherently bonded corundum phase, wherein the composite has a very low porosity, i.e. 1% or less, and wherein the occurrence of catastrophic failure is rare.

As will be appreciated, the synthetic titanium-corundum composite has a fracture toughness value greater than 15 MPa·m½, which advantageously is significantly higher than the fracture toughness value of high-purity aluminum oxides used in ballistic armour applications of only 5 MPa·m½. Additionally, and as will be appreciated, the titanium alloy matrix advantageously provides the synthetic titanium-corundum composite with a significantly higher fracture toughness value than that of conventional composites having matrices consisting primarily of Ti—Al intermetallic compounds.

As will be appreciated, the temperature experienced by the tool during manufacture of the synthetic titanium-corundum composite in accordance with the methods described herein, is significantly lower than the temperature experienced by tools during conventional manufacturing methods. As will be understood, these lower temperatures advantageously extend the service life of the tool, as compared to tools used with during conventional manufacturing methods.

Of course, the above described example forms of the present application are intended to be illustrative only and in no way limiting. The described forms are susceptible to many modifications of form, arrangement of parts, details and order of operation. The disclosure, rather, is intended to encompass all such modifications within its scope, as defined by the claims, which should be given a broad interpretation consistent with the description as a whole.

The above disclosure generally describes various aspects of compositions and methods of the present disclosure. A more complete understanding can be obtained by reference to the following specific examples. These examples are described solely for the purpose of illustration and are not intended to limit the scope of the disclosure. Changes in form and substitution of equivalents are contemplated as circumstances might suggest or render expedient. Although specific terms have been employed herein, such terms are intended in a descriptive sense and not for purposes of limitation.

The following example illustrates various applications of the above-described forms.

Example

Titanium alloy composition Ti-6Al: an experiment was conducted with the objective of producing a synthetic titanium-corundum composite comprising a titanium alloy and a coherently bonded corundum phase (volume percentage of 60% and a mean grain size less than 10 μm), with the titanium alloy comprising α-titanium and $α_2$-titanium, wherein the weight percentage of $α_2$-titanium is less than 10%, and the atomic percentage of aluminum is about 10.2% (i.e. a Type-A2 synthetic titanium-corundum composite).

The titanium oxide used was titanium dioxide of 99% purity and a minimum rutile content of 98%. The quantity of reactants needed to achieve the desired composition was determined using the chemical reaction formula:

$$9TiO_2 + [12+x]Al \rightarrow [3(3-x)]Ti + [x]Ti_3Al + 6Al_2O_3 - \Delta H$$

with x=1.02, which yields:

$$9TiO_2 + 13.02Al \rightarrow 5.94Ti + 1.02Ti_3Al + 6Al_2O_3 - \Delta H$$

According to this formula, the weight percentage of $α_2$-titanium in the titanium alloy will initially be about 38%; however, according to the formula the atomic percentage of aluminum in the titanium alloy will be about 10.2%, which indicates that upon solutionizing heat treatment, the aluminum atoms in the $\alpha_2$-titanium phase will diffuse into the $\alpha$-titanium solid solution, thereby reducing the final weight percentage of $\alpha_2$-titanium to a value less than 10%.

Accordingly, 98.6 g of 99.7% pure spherical particulate aluminum with a mean granule size of 5 µm was blended with 198.2 g of particulate titanium dioxide with a mean granule size of 0.5 µm and 5.0 g of diyttrium trioxide with granule size ranging from 0.030 to 0.045 µm, in a 5 L jar mill containing 750 ml of acetone and about 500 g of aluminum oxide balls ranging in size from 5 to 15 mm, for 4 hours at a rotational speed of 280 revolutions per minute. After 4 hours of milling, the acetone was substantially removed from the mixture using a rotary evaporator until the mixture had the consistency of a parts. The mixture was then allowed to continue drying for 4 hours with the open jar placed on a hot plate at 275° C.

To make the preform, 2 g of the mixture was placed in a cylindrical compacting tool with a diameter of 12 mm. A vacuum of about –90 kPa was applied to the sealed compacting tool for 10 s, and then the mixture was subjected to an applied compressive stress of 2.6 MPa for 15 s. The preform was then removed from the compacting tool and placed in a graphite crucible.

The graphite crucible containing the preformed mixture was placed in an atmosphere-controlled tube furnace at room temperature, or about 20° C. A vacuum of about –90 kPa was applied to the tube, and then the tube was filled with argon gas to a pressure of about 0.05 MPa. The argon gas was then purged from the tube, and the purging process was twice repeated. The tube was then filled with argon gas to a pressure of about 100 kPa and the temperature of the furnace was increased to 900° C. and held for 10 m, after which the furnace was allowed to cool to a temperature less than 300° C. Upon removal, the mixture was found to be fully reacted. The process was then repeated using additional preforms until the critical temperature for the mixture was determined to be in the range of 850 to 860° C. Subsequently, a total of 5 reacted samples of the mixture were produced at a maximum furnace temperature of 863° C. The volume percentage of corundum in the samples was measured using micrograph image analysis and was found to range from 58% to 62%. The composition of the sample was determined using X-ray diffractometry and was found to be $\alpha$-titanium, $\beta$-titanium, $\alpha_2$-titanium, and corundum, which confirmed the samples were fully reacted and the synthetic titanium-corundum composite was successfully produced. Based on the semi-quantitative X-ray diffractometry, the weight percentage of $\alpha_2$-titanium in the composite was estimated to range from 11% to 16%, which agrees with the theoretical value of 15.9%

The four remaining samples were subjected to solutionizing heat treatments, with the first sample held at 900° C. for 1 h, the second sample held at 900° C. for 2 h, the third sample held at 900° C. for 3 h, and the forth sample held at 900° C. for 4 h. The compositions of the samples were determined using X-ray diffractometry, the results of which are shown in FIGS. 7A to 7E.

Based on the semi-quantitative X-ray diffractometry, the results of which are tabulated in Table 1, the weight percentages of $\alpha_2$-titanium in the composites were 6% to 12%, 5% to 10%, 2% to 8%, and 1% to 5%, respectively, which demonstrates that the composition of the titanium alloy in the synthetic titanium-corundum composite may be controlled and determined via a solutionizing heat treatment, and that substantially solid solution phases may be obtained:

TABLE 1

| Sample (FIG.) | Heat Treatment Time at 900° C. (h) | $\alpha_2$-Ti (AlTi$_3$) wt % | Ti solid solution ($\alpha$ and $\beta$) wt % |
|---|---|---|---|
| 7A | 0 | 11-16% | 17-28% |
| 7B | 1 | 6-12% | 22-32% |
| 7C | 2 | 5-10% | 23-34% |
| 7D | 3 | 2-8% | 26-36% |
| 7E | 4 | 1-5% | 27-39% |

With an assumed fracture toughness ($K_{Ic}$) value for the titanium alloy taken from published data and ranging from 45 to 50 MPa·m$^{1/2}$ (as a result of solutionizing heat treatment), the expected fracture toughness value for the synthetic titanium-corundum composite of the present example ranges from 21 to 23 MPa·m$^{1/2}$, which compares to the known fracture toughness of the high-purity aluminum oxide used in ballistic armour applications of only 5 MPa·m$^{1/2}$. Likewise, the work of fracture and specific work of fracture for the synthetic titanium-corundum composite of the present example are expected to range from 1,725 to 2,070 J/m$^2$ and 417 to 500 J/g/(m$^2$/cm$^3$), respectively, which compare very favorably to the values for high-purity alumina of 72 J/m$^2$ and 18 J/g/(m$^2$/cm$^3$), respectively.

Although forms have been described above with reference to the accompanying drawings, those of skill in the art will appreciate that variations and modifications may be made without departing from the scope thereof as defined by the appended claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A synthetic titanium-corundum composite, comprising:
   a titanium alloy, the titanium alloy being a first reaction product of an uncontrolled exothermic reaction from a mixture comprising reactant aluminum, titanium oxide, and at least one grain refiner; and
   a coherently bonded corundum phase, the coherently bonded corundum phase being a second reaction product of said uncontrolled exothermic reaction,
   wherein the titanium alloy comprises at least one elemental titanium solid solution,
   wherein the atomic percentage of the aluminum in the titanium alloy ranges from 0.5% to 24.5%; and
   wherein the at least one of the elemental titanium solid solution is $\alpha$-titanium.

2. The synthetic titanium-corundum composite of claim 1, wherein the titanium alloy contains one or more of alloying elements selected from the group consisting of bismuth (Bi), boron (B), carbon (C), chromium (Cr), iron (Fe), manganese (Mn), molybdenum (Mo), nickel (Ni), niobium (Nb), palladium (Pd), ruthenium (Ru), silicon (Si), tin (Sn), vanadium (V), and zirconium (Zr).

3. The synthetic titanium-corundum composite of claim 1, wherein the corundum ranges, in volume percentage, from 39% to 62%.

4. The synthetic titanium-corundum composite of claim 1, wherein the titanium-corundum composite has a mean fracture toughness value greater than about 15 MPa·m$^{1/2}$.

5. The synthetic titanium-corundum composite of claim 1, wherein the titanium-corundum composite has a mean fracture toughness value between about 21 and about 24 MPa·m$^{1/2}$.

6. The synthetic titanium-corundum composite of claim 1, wherein a mean size of corundum grains is about 50 µm or less.

7. The synthetic titanium-corundum composite of claim 1, wherein a porosity is about 1% or less.

8. A ballistic strike face tile formed from the synthetic titanium-corundum composite of claim 1.

9. The synthetic titanium-corundum composite of claim 1, wherein the mixture further comprises at least one low-temperature initiator.

10. A synthetic titanium-corundum composite, comprising:
 a titanium alloy, the titanium alloy being a first reaction product of an uncontrolled exothermic reaction from a mixture comprising reactant aluminum, titanium oxide, and at least one grain refiner; and
 a coherently bonded corundum phase, the coherently bonded corundum phase being a second reaction product of said uncontrolled exothermic reaction,
 wherein the titanium alloy comprises at least one elemental titanium solid solution,
 wherein the atomic percentage of aluminum in the titanium alloy ranges from 0.5% to 24.5%, and
 wherein the at least one elemental titanium solid solution is β-titanium.

11. The synthetic titanium-corundum composite of claim 10, wherein the mixture further comprises at least one low-temperature initiator.

12. A synthetic titanium-corundum composite, comprising:
 a titanium alloy, the titanium alloy being a first reaction product of an uncontrolled exothermic reaction from a mixture comprising reactant aluminum, titanium oxide, and at least one grain refiner; and
 a coherently bonded corundum phase, the coherently bonded corundum phase being a second reaction product of said uncontrolled exothermic reaction,
 wherein the titanium alloy comprises at least one elemental titanium solid solution,
 wherein the atomic percentage of aluminum in the titanium alloy ranges from 0.5% to 24.5%, and
 wherein the titanium alloy further comprises $\alpha_2$-titanium.

13. The synthetic titanium-corundum composite of claim 12, wherein the mixture further comprises at least one low-temperature initiator.

* * * * *